(12) United States Patent
Yang et al.

(10) Patent No.: US 12,490,267 B2
(45) Date of Patent: Dec. 2, 2025

(54) METHOD AND APPARATUS FOR TRANSMITTING AND RECEIVING WIRELESS SIGNALS IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 745 days.

(21) Appl. No.: 17/594,942

(22) PCT Filed: May 4, 2020

(86) PCT No.: PCT/KR2020/005917
§ 371 (c)(1),
(2) Date: Nov. 3, 2021

(87) PCT Pub. No.: WO2020/226406
PCT Pub. Date: Nov. 12, 2020

(65) Prior Publication Data
US 2022/0240288 A1 Jul. 28, 2022

(30) Foreign Application Priority Data
May 3, 2019 (KR) .......................... 10-2019-0052305

(51) Int. Cl.
*H04W 72/02* (2009.01)
*H04W 72/21* (2023.01)
(Continued)

(52) U.S. Cl.
CPC ........... *H04W 72/21* (2023.01); *H04W 72/23* (2023.01); *H04W 74/0833* (2013.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

| | | | |
|---|---|---|---|
| 2019/0253200 A1* | 8/2019 | Salem | H04W 74/0808 |
| 2020/0145143 A1* | 5/2020 | Nemeth | H04L 1/1819 |
| 2022/0086824 A1* | 3/2022 | Kundu | H04L 5/0053 |

FOREIGN PATENT DOCUMENTS

| | | |
|---|---|---|
| WO | 2017217799 | 12/2017 |
| WO | 2019027995 | 2/2019 |

OTHER PUBLICATIONS

PCT International Application No. PCT/KR2020/005917, International Search Report dated Aug. 24, 2020, 17 pages.
(Continued)

*Primary Examiner* — Bo Hui A Zhu
(74) *Attorney, Agent, or Firm* — LEE, HONG, DEGERMAN, KANG & WAIMEY

(57) ABSTRACT

The present invention relates to a wireless communication system, and more specifically, to a method and an apparatus for same, the method comprising the steps of: receiving indication information related to a PUCCH resource set of a specific PUCCH format via system information; receiving, on one or more CCEs, a PDCCH including resource indication information; for transmitting uplink control information, performing CAP with regard to a plurality of candidate PUCCH resources; and transmitting the uplink control information via a specific candidate PUCCH resource for which the CAP succeeded among the plurality of candidate PUCCH resources.

15 Claims, 21 Drawing Sheets

(51) Int. Cl.
*H04W 72/23* (2023.01)
*H04W 74/0833* (2024.01)

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56; H04L 5/0053; H04L 5/0055; H04L 5/0057
See application file for complete search history.

(56) References Cited

OTHER PUBLICATIONS

LG Electronics Inc., "Physical layer design of UL signals and channels for NR-U," 3GPP TSG RAN WG1 #96bis, R1-1904621, Apr. 2019, 11 pages.
CAICT, "Discussion on UL signals and channels design in NR-U," 3GPP TSG RAN WG1 #96bis, R1-1905128, Apr. 2019, 4 pages.
MediaTek Inc., "UL Signals and Channels for NR-U operation," 3GPP TSG RAN WG1 #96bis, R1-1904481, Apr. 2019, 13 pages.

* cited by examiner (a) Carrier aggregation between L-band and U-band (b) Standalone U-band(s)

METHOD AND APPARATUS FOR TRANSMITTING AND RECEIVING WIRELESS SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2020/005917, filed on May 4, 2020, which claims the benefit of earlier filing date and right of priority to Korean Patent Application No. 10-2019-0052305, filed on May 3, 2019, the contents of which are all incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method for transmitting uplink control information by a user equipment (UE) in a wireless communication system includes receiving indication information related to a physical uplink control channel (PUCCH) resource set of a specific PUCCH format through system information, receiving a physical downlink control channel (PDCCH) including resource indication information on at least one control channel element (CCE), for transmission of the uplink control information, performing a channel access procedure (CAP) with respect to a plurality of candidate PUCCH resources, and transmitting the uplink control information through a specific candidate PUCCH resource having successfully performed the channel access procedure (CAP) from among the plurality of candidate PUCCH resources. A plurality of start symbols corresponding to the plurality of candidate PUCCH resources may be determined based on the resource indication information and a start CCE index of the PDCCH with respect to a single value configured for the PUCCH resource set.

In accordance with a second aspect of the present disclosure, a user equipment (UE) for use in a wireless communication system includes at least one processor, and at least one memory operatively connected to the at least one processor, and configured to store instructions such that the at least one processor performs specific operations by executing the instructions. The specific operations may include receiving indication information related to a physical uplink control channel (PUCCH) resource set of a specific PUCCH format through system information, receiving a physical downlink control channel (PDCCH) including resource indication information on at least one control channel element (CCE), for transmission of the uplink control information, performing a channel access procedure (CAP) with respect to a plurality of candidate PUCCH resources, and transmitting the uplink control information through a specific candidate PUCCH resource having successfully performed the channel access procedure (CAP) from among the plurality of candidate PUCCH resources. A plurality of start symbols corresponding to the plurality of candidate PUCCH resources may be determined based on the resource indication information and a start CCE index of the PDCCH with respect to a single value configured for the PUCCH resource set.

In accordance with a third aspect of the present disclosure, a device for a user equipment (UE) includes at least one processor, and at least one memory operatively connected to the at least one processor, and configured to store instructions such that the at least one processor performs specific operations by executing the instructions. The specific operations may include receiving indication information related to a physical uplink control channel (PUCCH) resource set of a specific PUCCH format through system information, receiving a physical downlink control channel (PDCCH) including resource indication information on at least one control channel element (CCE), for transmission of the uplink control information, performing a channel access procedure (CAP) with respect to a plurality of candidate PUCCH resources, and transmitting the uplink control information through a specific candidate PUCCH resource having successfully performed the channel access procedure (CAP) from among the plurality of candidate PUCCH resources. A plurality of start symbols corresponding to the plurality of candidate PUCCH resources may be determined based on the resource indication information and a start CCE index of the PDCCH with respect to a single value configured for the PUCCH resource set.

In accordance with a fourth aspect of the present disclosure, a computer-readable storage medium is configured to store at least one computer program including instructions such that at least one processor performs specific operations for a first user equipment (UE) by executing the instructions. The computer-readable storage medium may include performing the specific operations. The specific operations may include receiving indication information related to a physical uplink control channel (PUCCH) resource set of a specific PUCCH format through system information; receiving a physical downlink control channel (PDCCH) including resource indication information on at least one control channel element (CCE), for transmission of the uplink control information, performing a channel access procedure (CAP) with respect to a plurality of candidate PUCCH resources, and transmitting the uplink control information through a specific candidate PUCCH resource having successfully performed the channel access procedure (CAP) from among the plurality of candidate PUCCH resources. A plurality of start symbols corresponding to the plurality of candidate PUCCH resources may be determined based on the resource indication information and a start CCE index of the PDCCH with respect to a single value configured for the PUCCH resource set.

Preferably, the specific candidate PUCCH resource may include a plurality of discontinuous resource blocks (RBs) in a frequency domain.

Preferably, a length-12 sequence having a cyclic shift (CS) value corresponding to the uplink control information may be transmitted through resource blocks (RBs) of the specific candidate PUCCH resource without a demodulation reference signal (DMRS).

Preferably, the length-12 sequence may be repeatedly transmitted in a plurality of symbols, wherein an orthogonal cover code is applied to the plurality of symbols in a symbol level.

Preferably, the wireless communication system may include a 3rd Generation Partnership Project (3GPP) New Radio (NR) wireless communication system, and the specific PUCCH format may be PUCCH format 0.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the present disclosure and together with the description serve to explain the principle of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
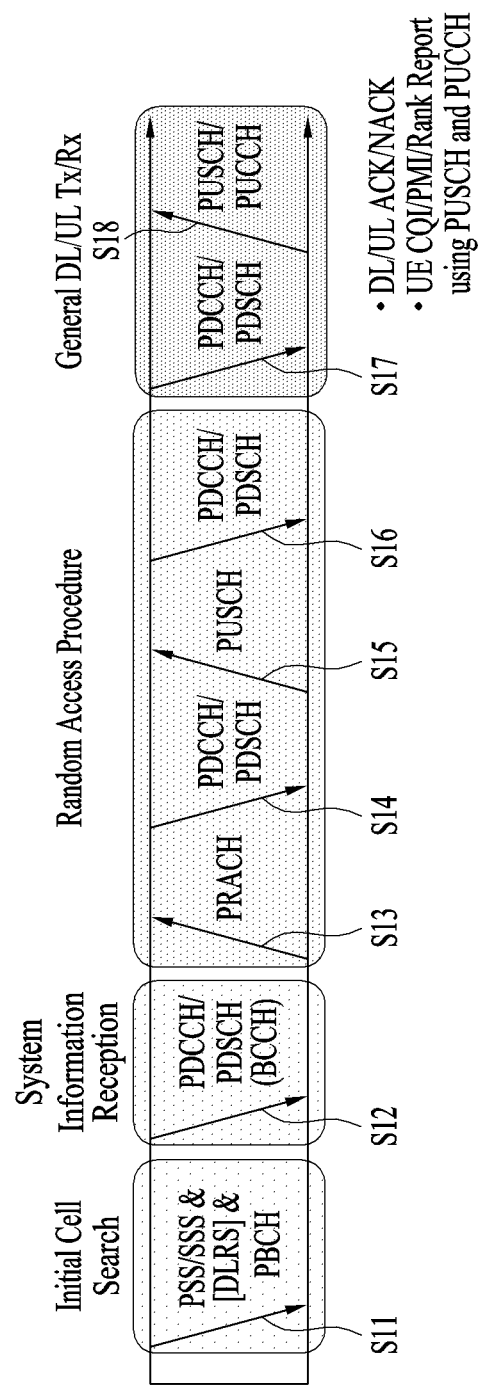
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
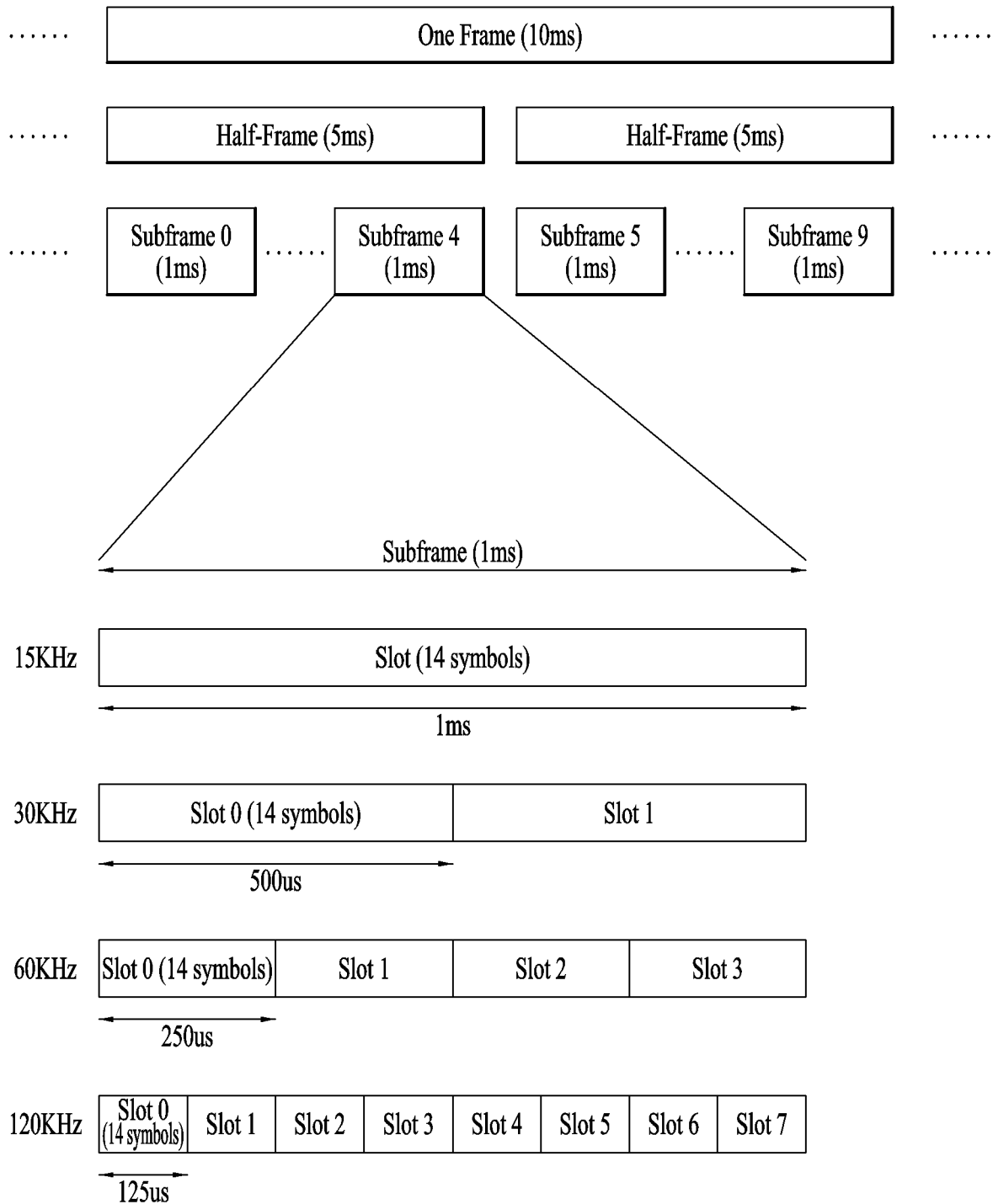
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * $2^u$) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

* Nslotsymb: number of symbols in a slot
* Nframe,uslot: number of slots in a frame
* Nsubframe,uslot: number of slots in a subframe Table 2 illustrates that the number of symbols per slot, the number of slots per frame, and the number of slots per subframe vary according to SCSs in an extended CP case.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
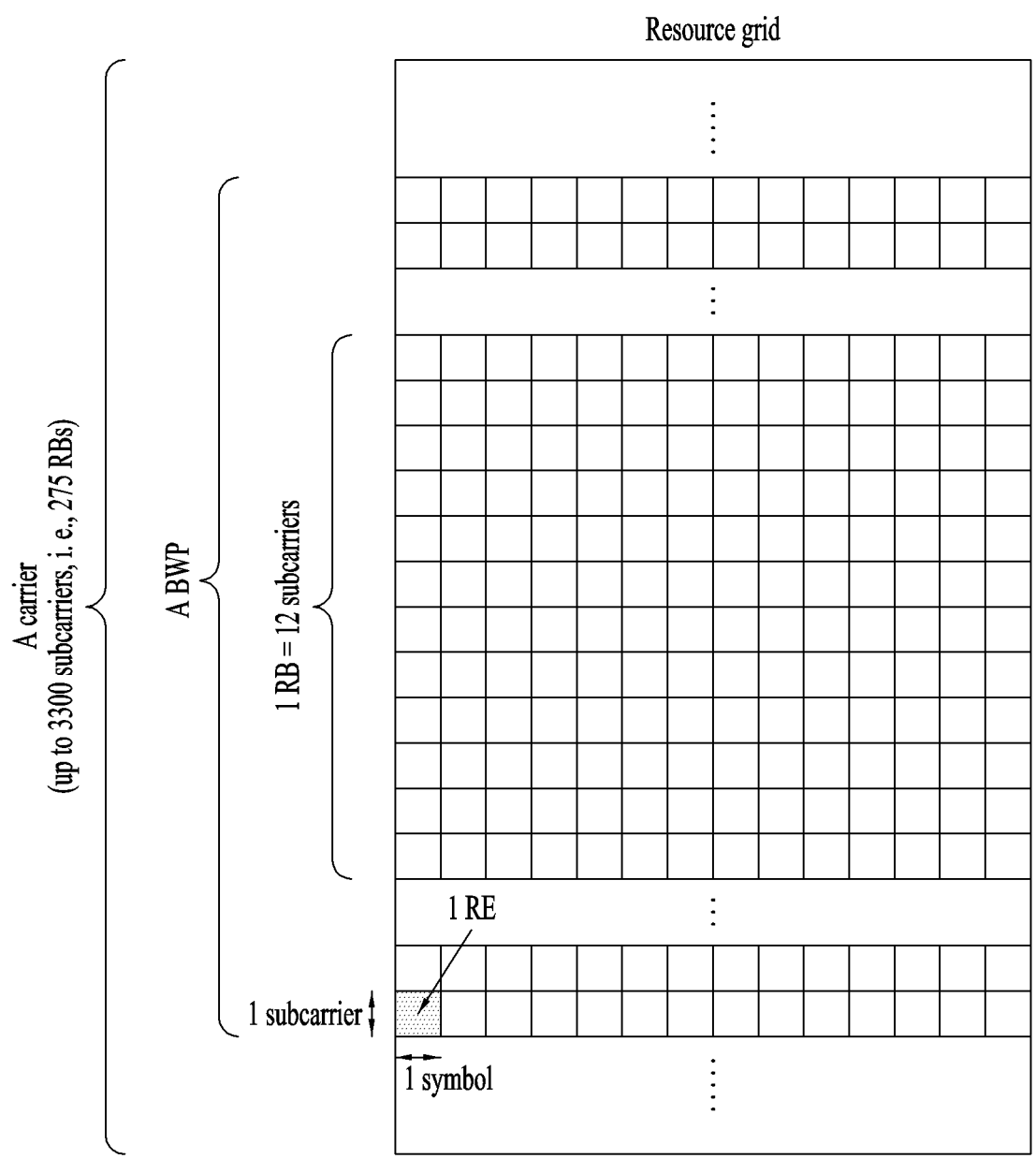
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
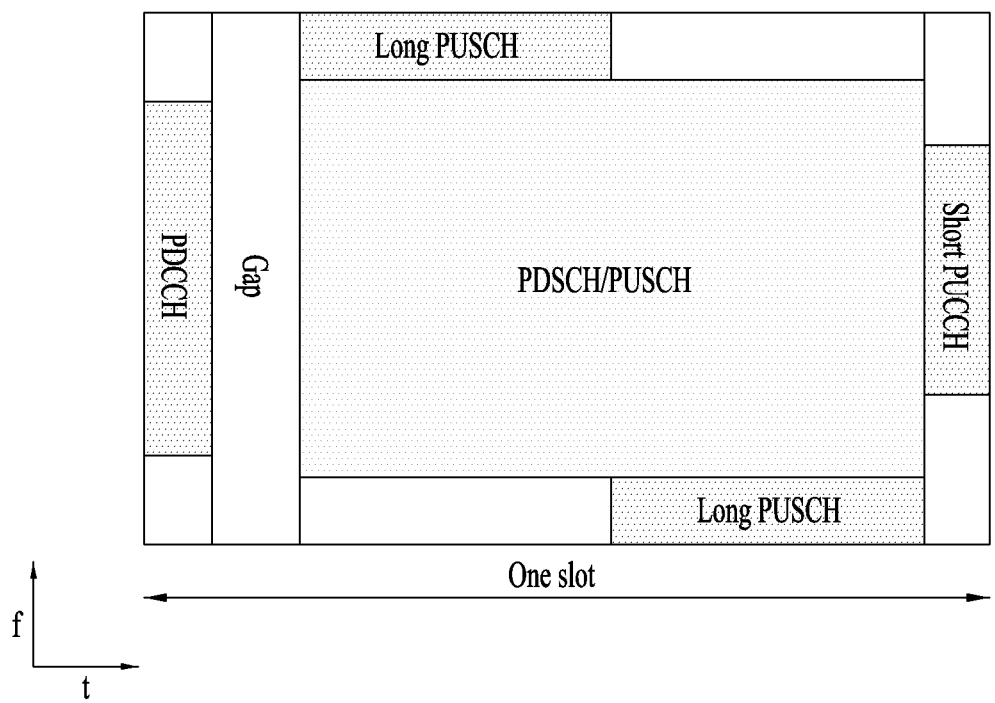
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PUCCH delivers uplink control information (UCI). The UCI includes the following information.
  SR: information used to request UL-SCH resources.
  HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.
  CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | RARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DPT (OCC) |

Figure 5:
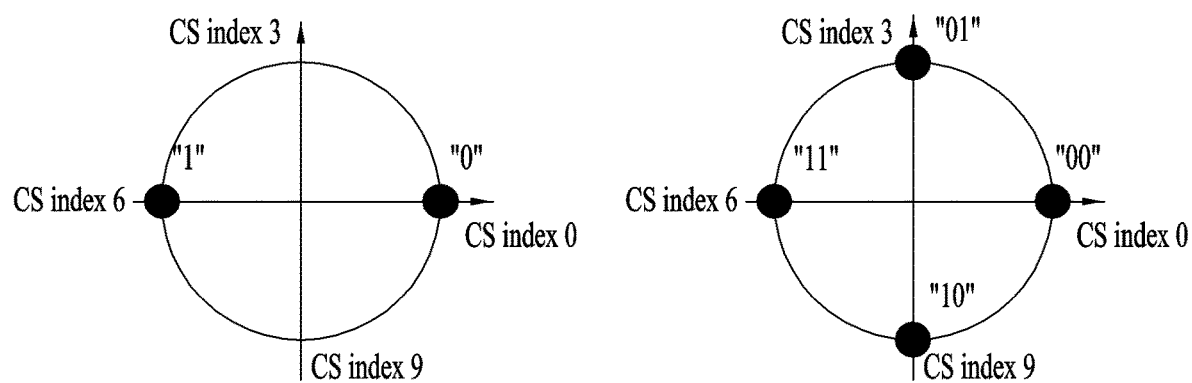
FIGS. 5 to 7 illustrate examples of a Physical Uplink Downlink Control Channel (PUCCH) format.

FIG. 5 illustrates an example of a structure of PUCCH format 0. PUCCH format 0 may consist of one PRB on the frequency axis, and may consist of 1 to 2 OFDM-based symbols on the time axis. PUCCH format 0 consists of a length-12 sequence corresponding to UCI without DMRS. PUCCH format 0 may select only one from among the sequences, and may transmit the selected sequence, thereby transmitting UCI. Referring to FIG. 5, the plurality of sequences transmitted through PUCCH format 0 may be divided by a cyclic shift (CS), and a CS index may vary depending on UCI. For example, if the value of 1-bit UCI is set to zero '0', CS index 0 is used, and if the value of 1-bit UCI is set to '1', CS index 6 may be used. If the number of CS indexes is 12, a maximum of 6 UEs may be multiplexed into one PUCCH format 0. In this case, one UE may use only one of {CS index X, CS index X+6} to transmit the 1-bit UCI. X may have any value selected from among 0~5, and may be referred to as an initial CS index. Similarly, in order to transmit 2-bit UCI, the UE may use any one of {CS index X, CS index X+3, CS index X+6, CS index X+9} (where X=0, 1, 2).

Figure 6:
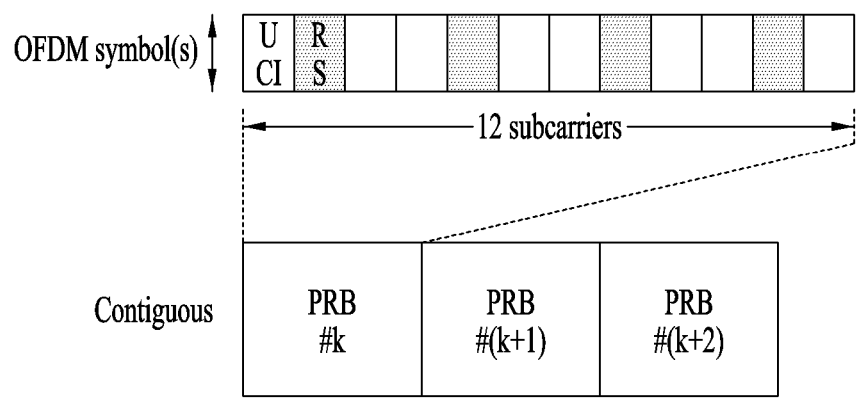

FIG. 6 illustrates an example of PUCCH format 2. PUCCH format 2 may consist of one or more consecutive PRBs on the frequency axis, and may consist of 1 to 2 OFDM symbols on the time axis. UCI and DMRS may be configured/mapped in a frequency division multiplexing (FDM) format within the same OFDM symbol. In the PRB, UCIs and DMRSs may be configured and mapped with the ratio therebetween being 3:1, and DMRSs may be located at subcarriers #1, #4, #7, and #10 within the PRB. Only IFFT can be applied to the encoded UCI bits without DFT processing. In 2-symbol PUCCH format 2, frequency hopping may be activated.

Figure 7:
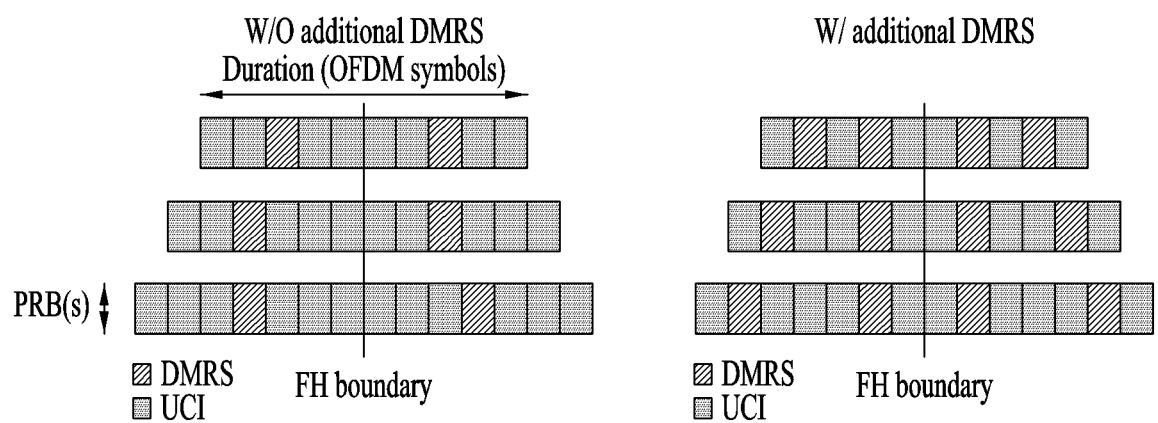

FIG. 7 illustrates an example of a structure of PUCCH format 3. PUCCH format 3 may include one or more consecutive PRBs on the frequency axis, and may include 4 to 14 OFDM symbols on the time axis. DMRSs and UCIs may be configured and mapped to different OFDM symbols in a TDM format. DFT may be applied to the encoded UCI bits, and may be transmitted without UE-to-UE multiplexing. That is, PUCCH resources of PUCCH format 3 may not include an orthogonal cover code (OCC).

Figure 8:
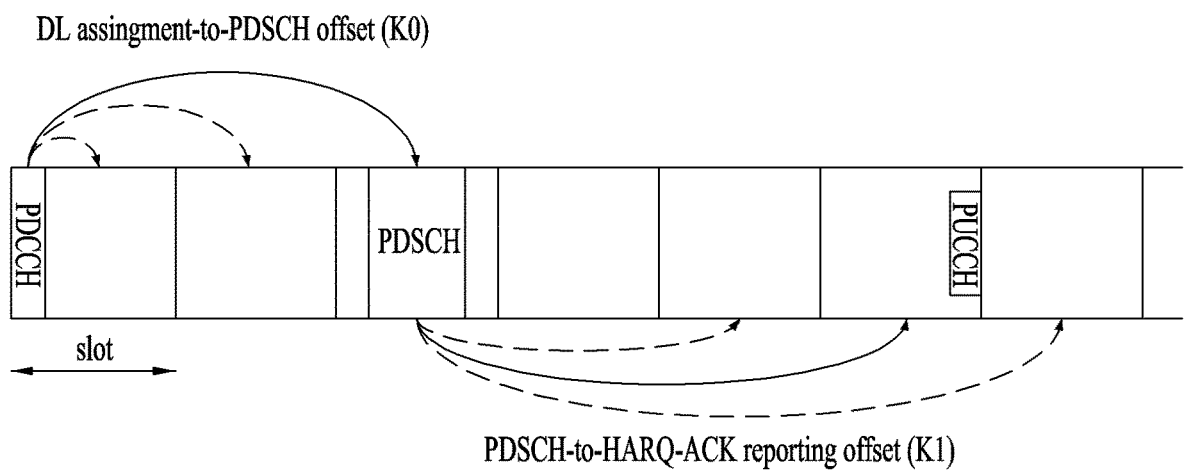
FIG. 8 illustrates an acknowledgment/negative acknowledgment (ACK/NACK) transmission process.

FIG. 8 illustrates an ACK/NACK transmission process. Referring to FIG. 8, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.
  Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates PUCCH resource used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs. On the other hand, when PUCCH allocation is performed at a time of UCI transmission, UCI may be transmitted through a PUSCH.

Figure 9:
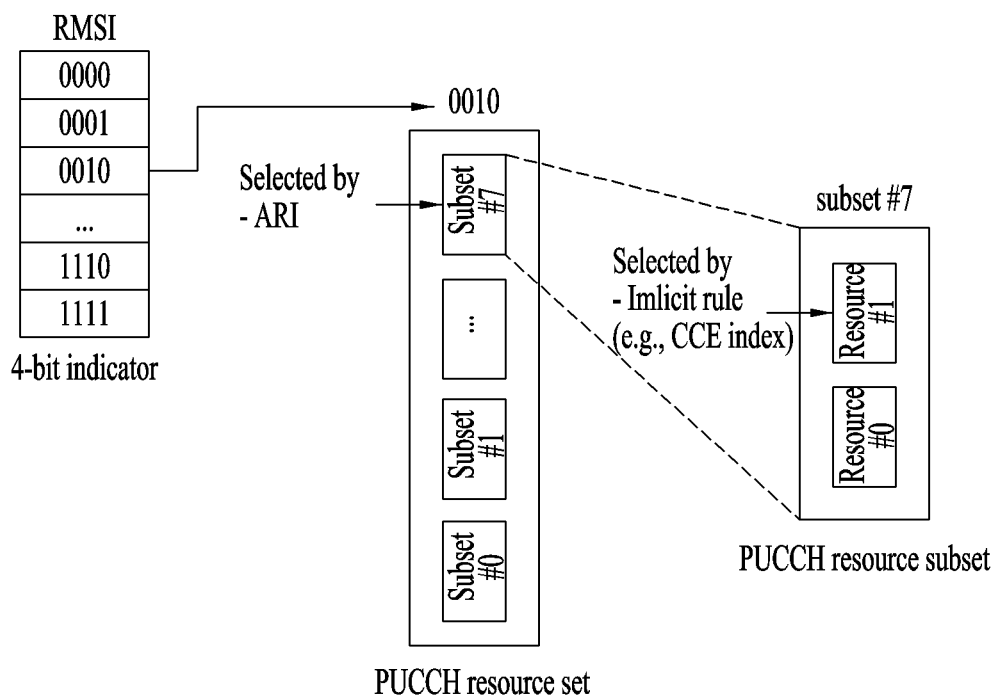
FIGS. 9 to 11 illustrate examples of PUCCH resource allocation.

FIG. 9 illustrates an example of PUCCH resource allocation based on a common PUCCH resource set. Referring to FIG. 9, PUCCH resources may be determined via three steps. In the first step 1 from among the three steps, any one of 16 PUCCH resource sets may be configured, as a 4-bit indicator within RMSI, in the UE. In the second step 2, one sub-set in the PUCCH resource set (configured in step 1) may be indicated to the UE as 3-bit information (ARI) included in DCI. In the third step 3, one PUCCH resource from among PUCCH resource sub-sets (indicated in step 2) may be indicated to the UE using implicit 1-bit information based on a CCE.

Table 5 illustrates an example of a common PUCCH resource set. Each RMSI index may correspond to one PUCCH resource set.

TABLE 5

| 4-bit RMSI index | PUCCH format | First symbol | PUCCH duration (Number of symbols) | PRB offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | floor ($N^{size}_{BWP}/4$) | {0, 3, 6, 9} |

Based on the PUCCH resource set indicated by RMSI, PUCCH resources used for UCI transmission may be indicated by a combination of ARI and CCE. First, the PUCCH resource index ($r_{PUCCH}$) may be denoted by 2*m+Floor (2*$CCE_{start}/N_{CCE}$). Here, 'm' denotes any of the values of 0~7 indicated by the ARI, $CCE_{start}$ denotes a first CCE index used for PDCCH transmission, and NCCE denotes a total number of CCEs included in a PUCCH search space.

Finally, PUCCH resources may be determined as follows.

Hopping direction (h)=Floor($r_{PUCCH}/8$)

PRB index=(i) Common PRB offset (Table 5)+UE-specific PRB offset [Floor(($r_{PUCCH}$−8 h)/$n_{CS}$)], (ii) $N^{size}_{BWP}$−(i) [According to the hopping direction, the PRB index used for PUCCH transmission may be hopped in the direction from (i) to (ii), or may be hopped in the direction from (ii) to (i)]

CS Index=Mod($r_{PUCCH}$−8 h, $n_{CS}$) [$n_{cs}$: the number of CSs in the initial CS index set]

Figure 10:
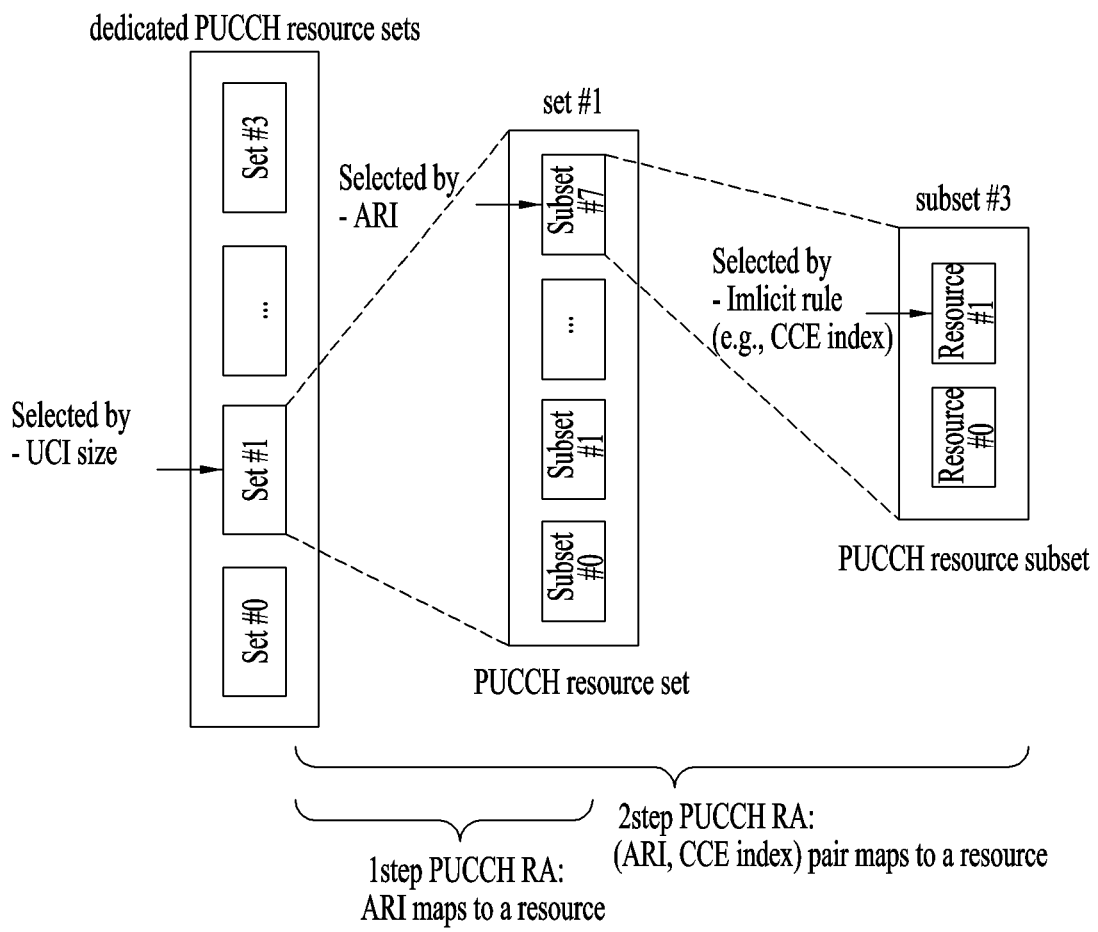

FIG. 10 illustrates an example of PUCCH resource allocation based on a UE-dedicated PUCCH resource set. Referring to FIG. 10, the base station (BS) may set a plurality of (UE-dedicated or UE-only) PUCCH resource sets to the UE. The UE may select a specific PUCCH resource set corresponding to a specific range according to the range of UCI (payload) size (e.g., the number of UCI bits). The UE-dedicated PUCCH resource set may serve as a part of the RRC connection procedure, or may be configured through a UE-specific higher layer (e.g., RRC) after completion of the RRC connection procedure.

PUCCH resource set #0, if the number of UCI bits ≤2

PUCCH resource set #1, if 2<the number of UCI bits ≤$N_1$

. . .

PUCCH resource set #(K−1), if $N_{K-2}$<the number of UCI bits≤$N_{K-1}$

Here, K denotes the number of PUCCH resource sets (K>1), $N_i$ denotes a maximum number of UCI bits supported by the PUCCH resource set (#i).

For example, PUCCH resource set #1 may consist of resources of PUCCH formats 0 to 1, and the remaining PUCCH resource sets other than the PUCCH resource set #1 may consist of resources of PUCCH formats 2 to 4 (see Table 4). Thereafter, the BS may transmit the DCI to the UE through a PDCCH, and may indicate PUCCH resources to be used for UCI transmission in a specific PUCCH resource set through the ARI included in the DCI format (step 1—PUCCH RA). In addition, when the PUCCH resource set consists of much more PUCCH resources than the number of states capable of being expressed by ARI, the ARI may indicate a PUCCH resource sub-set in the PUCCH resource set. Information about which one of PUCCH resources will be used in the indicated PUCCH resource sub-set will be determined by the implicit rules based on CCE index and the like (step 2—PUCCH RA).

Table 6 illustrates an example of PUCCH resource allocation based on ARI.

TABLE 6

| ARI ( = PRI) | PUCCH resource |
|---|---|
| 000 | $1^{st}$ PUCCH resource provided by a higher layer (e.g., RRC) signaling |
| 001 | $2^{nd}$ PUCCH resource provided by a higher layer (e.g., RRC) signaling |
| 010 | $3^{th}$ PUCCH resource provided by a higher layer (e.g., RRC) signaling |
| . . . | . . . |
| 111 | $8^{th}$ PUCCH resource provided by a higher layer (e.g., RRC) signaling |

Figure 11:
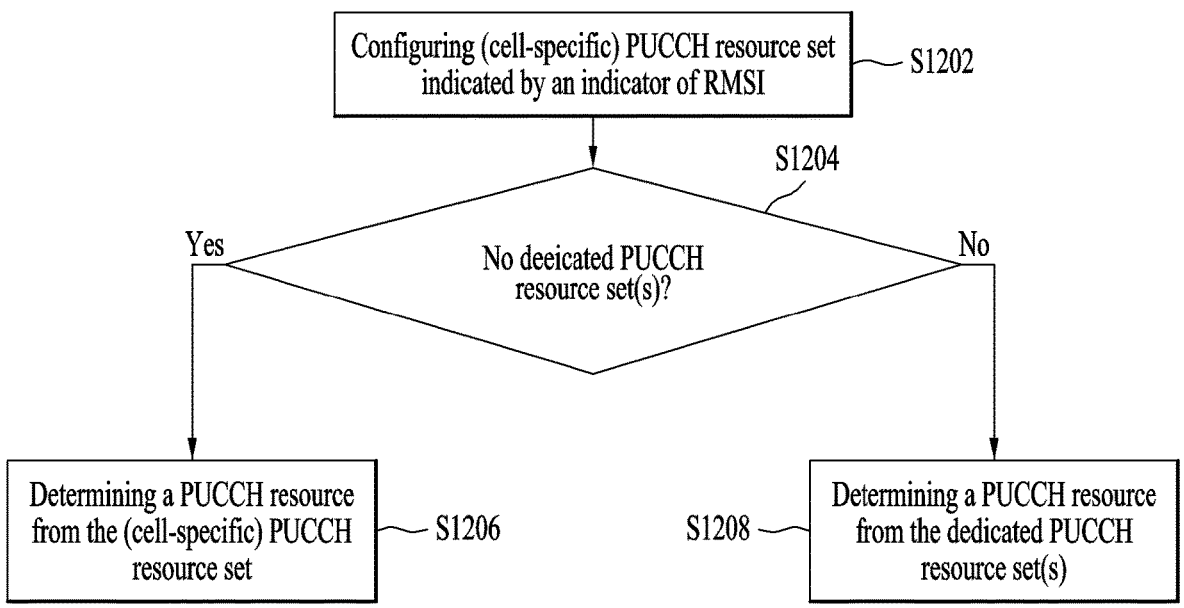

FIG. 11 illustrates an example of a PUCCH resource allocation procedure. Referring to FIG. 11, the UE may set a cell-specific (i.e., common) PUCCH resource set indicated by system information (e.g., RMSI) (S1202). Thereafter, when determining the PUCCH resources, the procedure for determining PUCCH resources may vary depending on whether the UE-dedicated PUCCH resource set(s) are set (S1204). When determining the PUCCH resources, if the UE-dedicated PUCCH resource set(s) are not set (S1204, YES), the UE may determine PUCCH resources from the common PUCCH resource set (S1206, see FIG. 9). On the other hand, if the UE-dedicated PUCCH resource set(s) are set (S1204, NO), the UE may determine PUCCH resources from the (UE-dedicated) PUCCH resource set (S1208, see FIG. 10). Since the (UE-dedicated) PUCCH resource set can be constructed through the RRC connection setup procedure, step S1206 can be applied only to HARQ-ACK transmission for a PDSCH prior to the RRC connection setup procedure. For example, step S1206 may be used in HARQ-ACK transmission for a PDSCH (e.g., RACH Msg4) during an initial access procedure. In contrast, step S1208 may be used for HARQ-ACK transmission for a PDSCH after the RRC connection setup procedure. For example, step S1208 may be used for HARQ-ACK transmission for a PDSCH after the initial access procedure.

Figure 12:
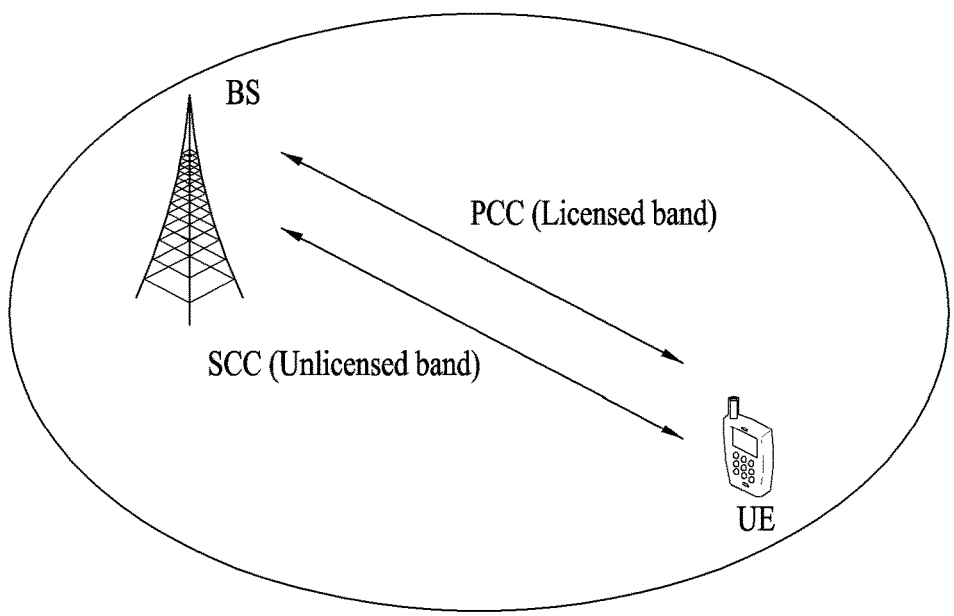
FIG. 12 is a diagram illustrating an example of a wireless communication system supporting an unlicensed band.
Figure 12:
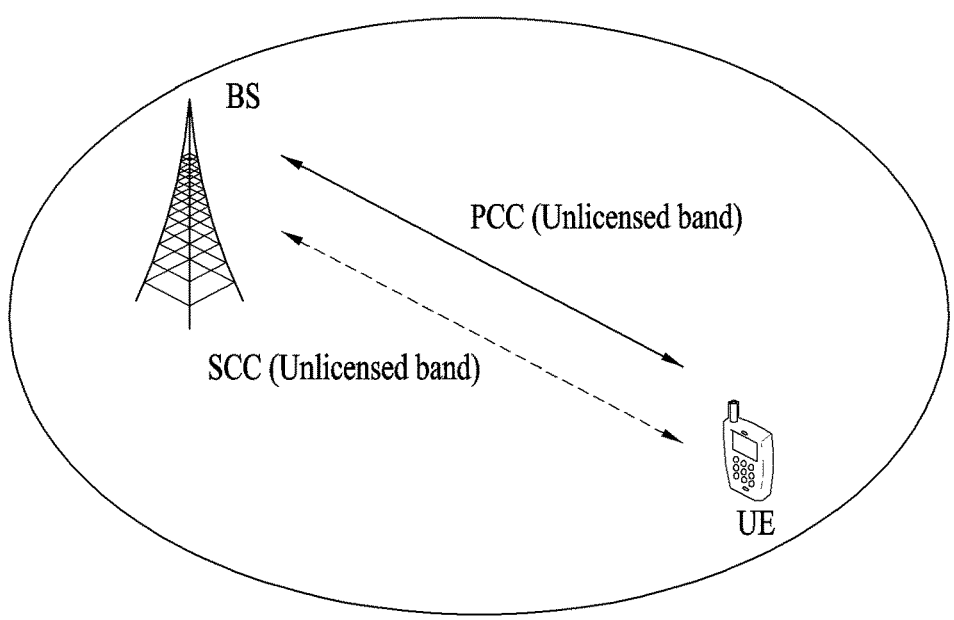

FIG. 12 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 12(a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 12(a) corresponds to the LAA of the 3GPP LTE system. FIG. 12(b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

Figure 13:
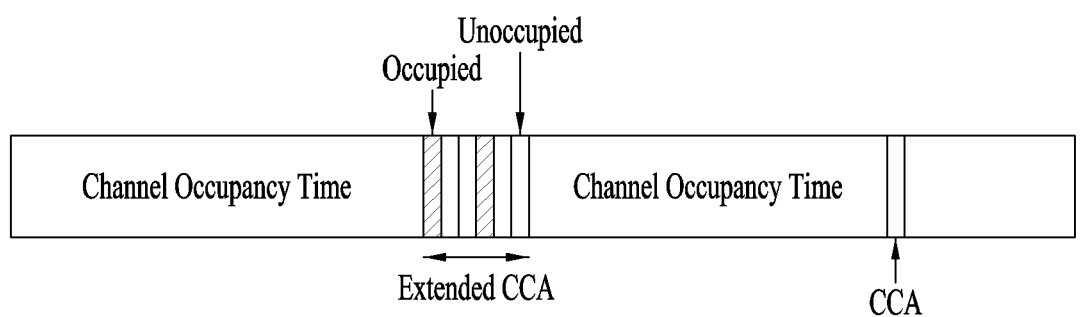
FIG. 13 is a diagram illustrating a method for occupying resources within an unlicensed band.

FIG. 13 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, . . . , 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects NE{1, 2, . . . , q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Example: Signal Transmission in NR-U

The 3GPP standardization group has been working on standardization of a 5G wireless communication system called new RAT (NR). The 3GPP NR system has been designed to support a plurality of logical networks in a single physical system and provide services with various requirements (e.g., eMBB, mMTC, URLLC, and so on) by changing a transmission time interval (TTI) and an OFDM numerology (e.g., an OFDM symbol duration, an SCS, and so on). With the recent emergence of smart devices, data traffic has significantly increased. In this context, use of an unlicensed band for cellular communication is under consideration in the 3GPP NR system, as is the case with licensed-assisted access (LAA) of the legacy 3GPP LTE system. Compared to the LAA, however, an NR cell in the unlicensed-band (NR U-cell) aims to support a standalone (SA) operation. For example, PUCCH, PUSCH, and sound reference signal (SRS) transmissions may be supported in the NR UCell.

To support an SA operation in a U-band, an HARQ-ACK feedback operation (for convenience, HARQ-ACK will be referred to as A/N) of a UE based on a PUCCH/PUSCH transmission in the U-band in response to reception of DL data (e.g., a PDSCH) may be essential. For example, a BS may schedule a PDSCH transmission for a specific UE in a channel occupancy time (COT) period secured by performing LBT (e.g., CCA) and indicate to the UE to transmit an A/N feedback for the PDSCH reception in the same COT period (or any gNB-initiated COT period started/occupied by a DL transmission of the BS). This process is referred to as an intra-COT A/N transmission, for convenience. In another example, the BS may indicate to the UE to transmit an A/N feedback for a PDSCH reception which has been scheduled/transmitted in a specific COT period in another COT period subsequent to the COT period (or a period that does not belong to the above gNB-initiated COT period) in view of a UE processing time involved in decoding of the PDSCH signal and encoding of a corresponding HARQ-ACK signal. This process is referred to as an inter-COT A/N transmission, for convenience (hereinbelow, LBT or CCA is referred to as LBT, for convenience).

In a U-band situation, one component carrier (CC) or BWP may be configured for a UE as a wideband (WB) CC or BWP having a larger bandwidth (BW) than in legacy LTE. However, a BW requiring CCA based on an independent LBT operation may be limited even in the WB CC/BWP (according to a specific regulation). In this context, when a subband for which LBT is individually performed is defined as an LBT-subband (LBT-SB), one WB CC/BWP may include a plurality of LBT-SBs.

Figure 14:
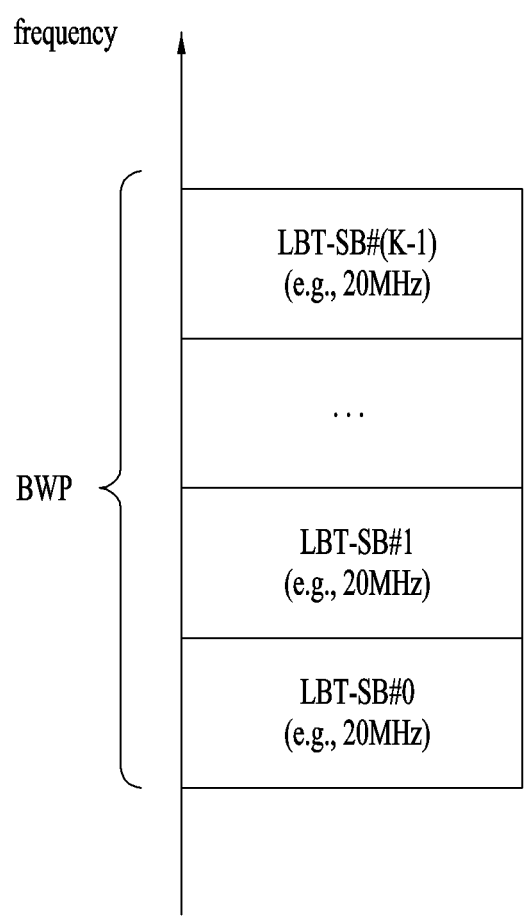
FIG. 14 is a diagram illustrating an example of a bandwidth part (BWP) structure.

FIG. 14 illustrates a BWP of a cell, which includes a plurality of LBT-SBs. An LBT-SB may be, for example, a band of 20 MHz. The LBT-SB may include a plurality of consecutive (P)RBs, and thus may be referred to as a (P)RB set. While not shown, a guard band (GB) may be interposed between LBT-SBs. Accordingly, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined in an increasing order from the lowest frequency to the highest frequency.

In the U-band situation, considering that the UE may fail in LBT for a UL transmission (e.g., an A/N PUCCH) (and thus drop the A/N PUCCH transmission), a method may be considered, in which a plurality of candidate PUCCH resources in time and/or frequency are indicated/configured (by higher-layer signaling (e.g., RRC signaling) and/or DCI) and a UE transmits an A/N PUCCH in a specific (one) PUCCH resource for which the UE has succeeded in LBT among the plurality of candidate PUCCH resources.

For example, for a single A/N PUCCH transmission, a plurality of candidate PUCCH resources (e.g., slots or symbol groups) multiplexed in TDM in the time domain may be indicated/configured (candidate T-domain resources). The UE may attempt LBT in the plurality of candidate PUCCH resources sequentially in time and transmit an A/N PUCCH in a specific (one) PUCCH resource in which the UE has succeeded in CCA (for the first time). In another example, for a single A/N PUCCH transmission, a plurality of candidate PUCCH resources (e.g., LBT-SBs/BWPs/CCs) multiplexed in FDM in the frequency domain may be indicated/configured (candidate F-domain resources). The UE may attempt LBT in the plurality of candidate PUCCH resources (at the same time) and transmit an A/N PUCCH in a specific (one) PUCCH resource in which the UE has succeeded in CCA.

In addition, in the U-band environment, a set of discontinuous (single) RBs (arranged at equal intervals) in the frequency domain may be defined as a unit resource used/allocated for UL (physical) channel/signal transmission in consideration of Occupied Channel Bandwidth (OCB) and Power Spectral Density (PSD) regulations. A set of discontinuous RBs will hereinafter be referred to as "RB interlace" for convenience of description.

Figure 15:
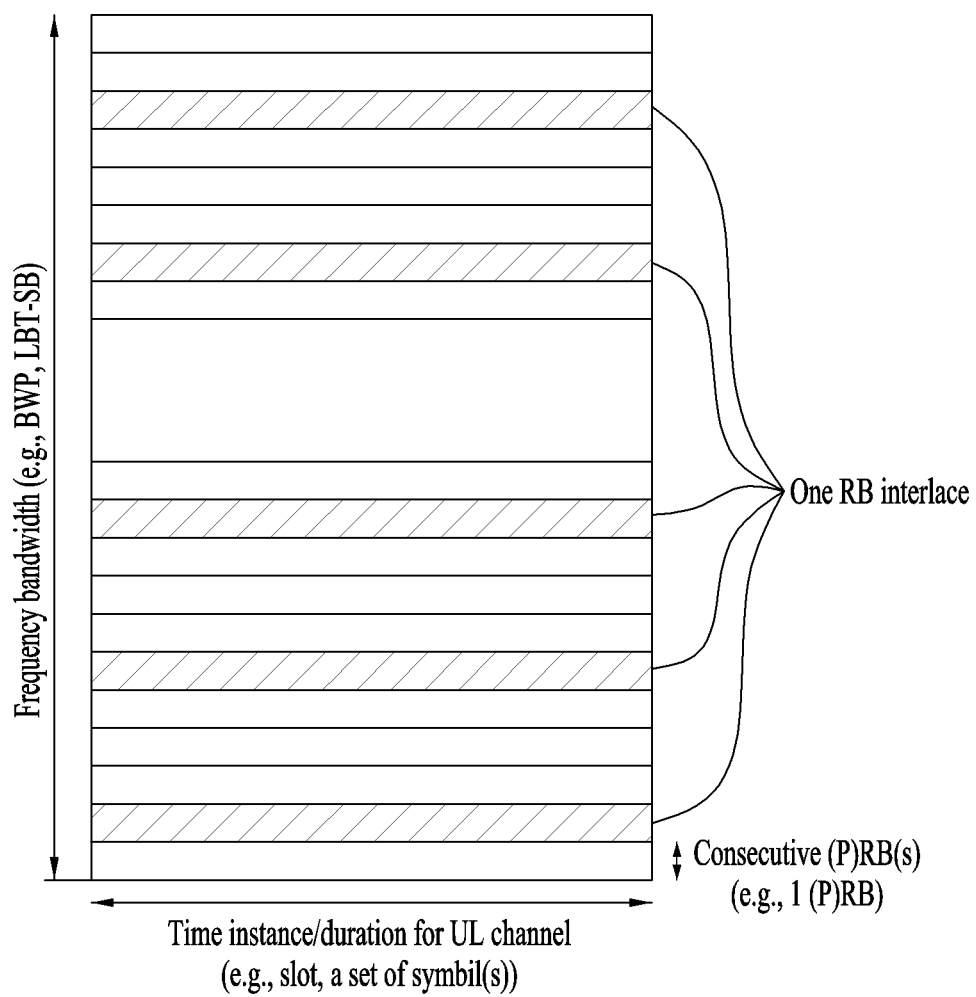
FIG. 15 is a diagram illustrating an example of a resource block (RB) interlace.

FIG. 15 illustrates an example of RB interlace. Referring to FIG. 15, the RB interlace may be defined as discontinuous RBs in the frequency band. For example, four RB interlaces may be made available in 20 RBs, and each RB interlace may consist of {RB #N, RB #(N+4), . . . } (N=0~3). A transmitter (e.g., UE) may use one or more interlaces in signal/channel transmission. Here, the frequency band may include (wideband) CC/BWP/LBT-SB, and each RB may include a PRB. The RB interlace may be defined as a frequency resource, or may be defined as frequency/time resources. If the RB interlace indicates frequency/time resources, the time resource may be defined as a time instance/period (or UL (physical) channel/signal transmission occasion) for a UL (physical) channel/signal. In this case, the time resource may include a slot or a set of symbols. Here, the symbol set may include one or more consecutive symbols for UL (physical) channel/signal. The symbol may include an OFDM-based symbol (e.g., CP-OFDM symbol, SC-FDMA symbol, and DFT-s-OFDM symbol). In this case, the UL (physical) channel/signal may include a PUCCH, a PUSCH or an SRS.

Hereinafter, a method for constructing/configuring a PUCCH resource set in the U-band situation and then determining PUCCH resources related to the PUCCH resource set will be described. In more detail, prior to configuration of the (dedicated) PUCCH resource set, a method for configuring an (initial) PUCCH resource set to be used for UCI transmission and PUCCH resources based on the configured PUCCH resource set, and then determining PUCCH resources based on the (initial) PUCCH resource set will be described in detail.

The following proposed method is not limited to the A/N feedback transmission operation/procedure over PUCCH/PUSCH, and can also be similarly applied to other UCI (e.g., CSI, SR) transmission over PUSCH, data transmission over PUSCH, and an SRS transmission operation/procedure.

In addition, the following proposed method is not limited to the U-band operation based on LBT, and can also be similarly applied to other L-band (or U-band) operations not involving such LBT.

Figure 16:
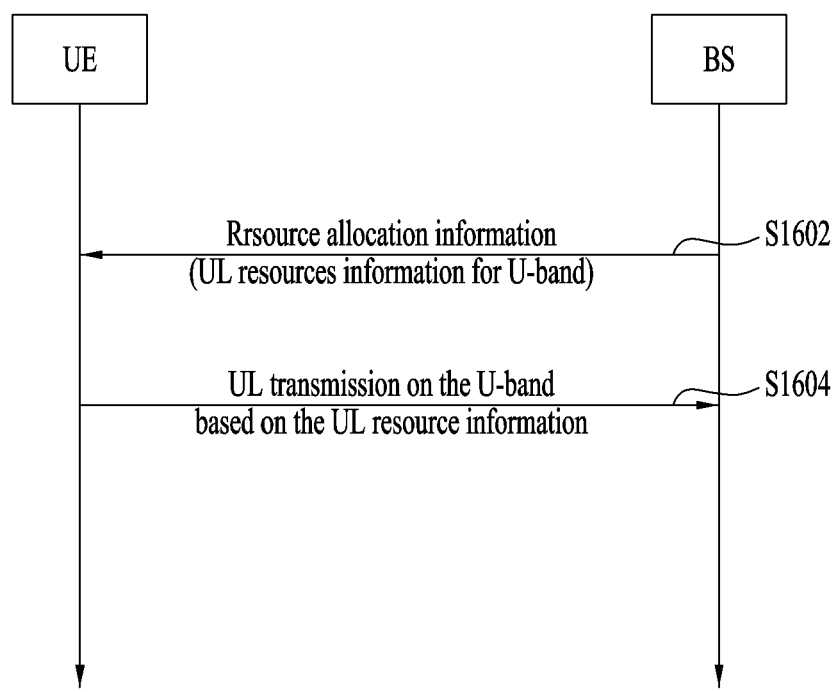
FIGS. 16 to 17 illustrate examples of UL transmission according to an embodiment of the present disclosure.

FIG. 16 is a flowchart illustrating an example of a UL transmission procedure that can be applied to the present disclosure. Referring to FIG. 16, the BS may transmit resource allocation information to the UE (S1602). Here, the resource allocation information may include UL resource information for U-band (e.g., CC, BWP). In this case, UL resources may include various physical resources used for transmission of a UL (physical) channel/signals (e.g., PUCCH, PUSCH, SRS). For example, the UL resources may include time resources (e.g., slot, symbol) for transmission of the UL (physical) channel/signals (e.g., PUCCH, PUSCH, SRS), frequency resources (e.g., (P)RB set), code resources (e.g., Cyclic Shift CS), an Orthogonal Cover Code (OCC), and various parameter values required for UL transmission. Resource allocation information may be indicated through system information (e.g., Master Information Block MIB, System Information Block SIB, higher layer (e.g., RRC) signaling, and/or DCI). In addition, some parts of the resource allocation information may be indicated through system information/higher layer (e.g., RRC) signal, and other parts thereof may be indicated through DCI. Thereafter, the UE may perform UL transmission based on UL resource information on the U-band (S1604). In more detail, after the UE confirms one or more UL resources based on UL resource information, the UE may perform UL transmission through (one) UL resource that was successful in CCA.

For example, when the UL channel/signal is an A/N PUCCH, the method of FIG. 16 can be performed as follows. After the BS transmits, to the UE, a PDCCH (i.e., PDCCH having a DL grant DCI (e.g., DCI format 1_0/1_1), simply referred to as DL grant PDCCH) that schedules DL data (e.g., PDSCH), the BS may transmit DL data (e.g., PDSCH) scheduled by the PDCCH. Then, the UE may transmit A/N signals through a PUCCH (S1604). Here, step S1602 may be replaced with a DL grant PDCCH transmission procedure, or may be performed separately from the DL grant PDCCH transmission procedure. In the latter case, some parts of UL resource information for the U-band may be instructed from the BS to the UE via the UL grant PDCCH. In addition, when the UL channel/signal is a PUSCH, the method of FIG. 16 can be performed as follows. The BS may transmit, to the UE, a PDCCH (i.e., a PDCCH having UL grant DCI, simply referred to as UL grant PDCCH) scheduling UL data (e.g., PUSCH). Then, the UE may transmit UL data (e.g., PDSCH) scheduled by the PDCCH (S1604). In this case, step S1602 may be replaced with the UL grant PDCCH transmission procedure, or may be performed separately from the UL grant PDCCH transmission procedure. In the latter case, some parts of UL resource information for the U-band may be instructed from the BS to the UE via the UL grant PDCCH.

On the other hand, in the present disclosure, the frequency (F)-domain OCC (F-OCC) may refer to an OCC for use in the frequency domain. F-OCC can be applied to a plurality of RE groups on an RE group basis on the frequency axis (for each OFDM symbol). Here, each RE group may include the same information, and each element of the OCC may be multiplied by the RE group-level within each RE group. The RE group may include one or more REs in the OFDM symbol, for example, REs in the PRB. For example, when the RE group includes only one RE, the transmission (Tx) signal may be spread to the RE level within the OFDM symbol. In addition, when the RE group includes one or more REs within the PRB, the transmission signal may be spread to the PRB-level within the OFDM symbol. Accordingly, the transmission signal may be spread to the R group-level on the frequency axis. In addition, a time (T)-domain OCC (T-OCC) may refer to an OCC for use in the frequency domain. T-OCC can be applied to the plurality of OFDM symbols on the time axis. In this case, each OFDM symbol may include the same information, and each element of the OCC may be multiplied by an OFDM symbol-level within each OFDM symbol. Thus, the transmission signal may be spread to the OFDM symbol-level on the time axis.

(1) Initial PUCCH Resource Set Configuration and PUCCH Resource Determination

First, based on PUCCH format 2 (PF2), the following methods can be used to configure the (initial) PUCCH resource set as well as to determine PUCCH resources related to the PUCCH resource set, and a detailed description thereof will hereinafter be given.

1) Code Division Multiplexing (CDM)
  A. Length-6 or Length-4 F-domain OCC without/with T-domain OCC (commonly applied to the following Alts (Alternatives)
    i. Opt 1: 6/4 UEs by length-6/4 F-domain OCC without T-domain CDM
      1. In a state where DMRS REs and UCI REs for each PRB in PUCCH resources are constructed with the ratio 6:6 between DMRS REs and UCI REs, length-6 F-OCC can be applied to each DMRS and each UCI. In addition, in a state where DMRS REs and UCI REs are constructed with the ratio 4:8 between DMRS REs and UCI REs, length-4 F-OCC can be applied to each DMRS and each UCI.
      2. RE mapping/OCC application may be performed on different (encoded) UCI bits for each OFDM symbol constructing the PUCCH, or RE mapping/OCC application may be repeatedly performed on the same (encoded) UCI bits.
    ii. Opt 2: 12/8 UEs by length-6/4 F-domain OCC with length-D (e.g., D=2) T-domain OCC
      1. In a state where DMRS REs and UCI REs for each PRB in PUCCH resources are constructed with the ratio 6:6 between DMRS REs and UCI REs, length-6 F0OCC can be applied to each DMRS and each UCI. In addition, in a state where DMRS REs and UCI REs are constructed with the ratio 4:8 between DMRS REs and UCI REs, length-4 F-OCC can be applied to each DMRS and each UCI.
      2. In a state where RE mapping/OCC application was repeatedly performed on the same (encoded) UCI bits for each OFDM symbol constructing a PUCCH, the length-D T0OCC can be additionally applied over D OFDM symbols (with an OFDM symbol-level).

2) Alt 1
  A. PUCCH interval (e.g., D symbols): The PUCCH interval may be allocated only one value, may be pre-defined, or may be configured for each (PUCCH) set through the SIB.
    i. The OFDM symbol period occupied by PUCCH resources may be predefined as the same one fixed value for all (plural) PUCCH resource sets, or only one value may be configured for each PUCCH resource set through the SIB.
  B. Start symbol (e.g., Index S): The start symbol may include multiple candidates, and may be configured for each (PUCCH) set through the SIB
    i. For the PUCCH transmission start symbol position/index, the same candidate value set may be pre-defined for all PUCCH resource sets, and the candidate value set may be configured for each PUCCH resource set through the SIB.
    ii. Alternatively, one specific candidate value may be configured for each PUCCH resource set through the SIB, and the corresponding candidate value set may be defined based on each candidate value. Each candidate value set may consist of candidate value(s), and may include a candidate value configured through the SIB. In this case, the candidate value set may be determined based on DCI signaling and/or PUCCH CCE index, according to the candidate value for each PDCCH resource set. Alternatively, based on the candidate value for PUCCH resource set, the candidate value set may be determined based on the implicit rules (e.g., with an index set having a constant/same interval).
  C. Frequency interlace index: The frequency interlace index has only one value, may be predefined, or may be configured for each (PUCCH) set through the SIB.
    i. For the frequency (e.g., RB interlace) position/index of PUCCH resources, the same one fixed value may be predefined, or one specific value may be configured for each PUCCH resource set through the SIB.
  D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {Start Symbol+F-OCC Index+T-OCC Index} by DCI/CCE
    1. Based on a specific field (e.g., PRI) included in DL grant DCI and/or a PDCCH transmission CCE index, a PUCCH start symbol, an F-OCC code index applied to a PUCCH, and/or a T-OCC code index can be determined. In relation to PUCCH resource allocation, the PUCCH transmission CCE index may refer to a CCE having the lowest index from among CCE(s) used for PDCCH transmission.
  ii. Opt 2: {Start Symbol+F-OCC index} by DCI/CCE (T-OCC index=0 or no T-OCC)
    1. Based on a specific field contained in DCI and/or a PDCCH transmission CCE index, a PUCCH start symbol and/or F-OCC code index can be determined.
    2. T-OCC code index may be fixed to a specific value (e.g., index 0), or T-OCC may not be applied to the T-OCC code index as needed.
  iii. Opt 3: {Start Symbol+T-OCC index} by DCI/CCE (F-OCC index=0)
    1. Based on a specific field in DCI and/or a PDCCH transmission CCE index, the PUCCH start symbol and/or T-OCC code index may be determined.
    2. F-OCC code index may be fixed to a specific value (e.g., index 0).
  iv. Opt 4: {Start Symbol} by DCI/CCE (F-OCC index=0, T-OCC index=0 or no T-OCC)
    1. Based on a specific field in DCI and/or a PDCCH transmission CCE index, the PUCCH start symbol can be determined.
    2. F-OCC code index may be fixed to a specific value (e.g., Index 0). T-OCC code index may also be fixed to a specific value (e.g., Index 0), or T-OCC may not be applied to the T-OCC code index.
3) Alt 2
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be pre-defined for all (multiple) PUCCH resource sets, or one specific value may be configured for each PUCCH resource set through the SIB.
  B. Start Symbol (e.g., Index S): The start symbol may be allocated only value, may be pre-defined, or may be configured for each (PUCCH resource) set through the SIB.
    i. For the PUCCH transmission start symbol position/index, the same one fixed value may be predefined for all PUCCH resource sets, or one specific value may be configured for each PUCCH resource set through the SIB.
  C. Frequency Interlace Index: The frequency interlace index may include multiple candidates, may be pre-defined, or may be configured for each (PUCCH resource) set through the SIB.
    i. For the frequency (e.g., RB interlace) position/index of PUCCH resources, the same (multiple) candidate index sets may be predefined for all PUCCH resource sets, or a specific candidate index set may be configured for each PUCCH resource set through the SIB.
    ii. In addition, one specific candidate value may be configured for each PUCCH resource set through the SIB, and (multiple) candidate index sets may be defined based on the corresponding candidate index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
  D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
    i. Opt 1: {Frequency Index+F-OCC index+T-OCC index} by DCI/CCE
      1. Based on a specific field included in DL grant DCI and/or a PDCCH transmission CCE index, a frequency (e.g., RB interlace) index of PUCCH resources, F-OCC code index applied to PUCCH, and/or a T-OCC code index can be determined.
    ii. Opt 2: {Frequency Index+F-OCC Index} by DCI/CCE (T-OCC Index=0 or no T-OCC)
      1. Based on a specific field contained in DCI and/or a PDCCH transmission CCE index, a frequency (e.g., RB interlace) index of PUCCH resources and/or F-OCC code index can be determined.
      2. T-OCC code index may be fixed to a specific value (e.g., index 0), or T-OCC may not be applied to the T-OCC code index as needed.
    iii. Opt 3: {frequency index+T-OCC index} by DCI/CCE (F-OCC index=0)
      1. Based on a specific field contained in DCI and/or a PDCCH transmission CCE index, a frequency index of PUCCH resources and/or a T-OCC code index can be determined.
      2. F-OCC code index may be fixed to a specific value (e.g., index 0).
    iv. Opt 4: {Frequency index} by DCI/CCE (F-OCC index=0, T-OCC index=0 or no T-OCC)
      1. Based on a specific field in DCI and/or a PDCCH transmission CCE index, the PUCCH frequency index may be determined.
      2. F-OCC code index may be fixed to a specific value (e.g., index 0). T-OCC code index may be fixed to a specific value (e.g., index 0), or T-OCC may not be applied to the T-OCC code index as needed.
4) Alt 3
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be pre-defined for all (multiple) PUCCH resource sets, or one specific value may be configured for each PUCCH resource set through the SIB.

B. Start Symbol (e.g., Index S): The start symbol may include multiple candidates, may be predefined, or may be configured for each (PUCCH resource) set through the SIB.
  i. For PUCCH transmission start symbol position/index, the same candidate index set may be predefined for all PUCCH resource sets, or a specific candidate index set may be configured for each PUCCH resource set through the SIB.
  ii. In addition, one specific candidate value may be configured for each PUCCH resource set through the SIB, and a candidate index set may be defined based on the corresponding candidate index. In this case, the candidate index set may be determined based on DCI signaling and/or a PDCCH CCE index, according to the candidate value for each PUCCH resource set. Alternatively, based on the candidate value for PUCCH resource set, the candidate index set may be determined based on the implicit rules (e.g., with an index set having a constant/same interval).
C. Frequency Interlace Index: The frequency interlace index may include multiple candidates, may be predefined, or may be configured for each (PUCCH resource) set through the SIB.
  i. For the frequency (e.g., RB interlace) position/index of PUCCH resources, the same (multiple) candidate index sets may be predefined for all PUCCH resource sets, or a specific candidate index set may be configured for each PUCCH resource set through the SIB.
  ii. Alternatively, one specific candidate value may be configured for each PUCCH resource set through the SIB, and candidate index sets may be defined based on the corresponding index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {Start Symbol+Frequency Index+F-OCC Index+T-OCC Index} by DCI/CCE
    1. Based on a specific field contained in DCI and/or a PDCCH transmission CCE index, a PUCCH start symbol, a frequency index of PUCCH resources, F-OCC code index, and/or a T-OCC code index can be determined.
  ii. Opt 2: {Start Symbol+Frequency Index+F-OCC Index} by DCI/CCE (T-OCC Index=0 or no T-OCC)
    1. Based on a specific field in DCI and/or a PDCCH transmission CCE index, the PUCCH start symbol, a frequency index of PUCCH resources, and/or F-OCC code index may be determined.
    2. T-OCC code index may be fixed to a specific value (e.g., index 0), or T-OCC may not be applied to the T-OCC code index as needed.
  iii. Opt 3: {Start Symbol+Frequency Index+T-OCC index} by DCI/CCE (F-OCC index=0)
    1. Based on a specific field contained in DCI and/or a PDCCH transmission CCE index, a PUCCH start symbol, a frequency index of PUCCH resources and/or a T-OCC code index can be determined.
    2. F-OCC code index may be fixed to a specific value (e.g., index 0).
  iv. Opt 4: {Start Symbol+Frequency Index} by DCI/CCE (F-OCC Index=0, T-OCC index=0 or no T-OCC)
    1. Based on a specific field in DCI and/or a PDCCH transmission CCE index, the PUCCH start symbol and/or a frequency index of PUCCH resources may be determined.
    2. F-OCC code index may be fixed to a specific value (e.g., Index 0). T-OCC code index may also be fixed to a specific value (e.g., Index 0), or T-OCC may not be applied to the T-OCC code index.
5) Alt 4
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be predefined for all (multiple) PUCCH resource sets, or one specific value may be configured for each PUCCH resource set through the SIB.
  B. Start Symbol (e.g., Index S): The start symbol has only one value, may be pre-defined, or may be configured for each (PUCCH resource) set through the SIB.
    i. For the PUCCH transmission start symbol position/index, the same one fixed value may be predefined for all (multiple) PUCCH resource sets, or one specific value may be configured for each PUCCH resource set through the SIB.
  C. Frequency Interlace Index: The frequency interlace index has only one value, may be pre-defined, or may be configured for each (PUCCH resource) set through the SIB.
    i. For the frequency (e.g., RB interlace) position/index of PUCCH resources, the same one fixed value may be predefined for all (multiple) PUCCH resource sets, or one specific value may be configured for each PUCCH resource set through the SIB.
  D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
    i. Opt 1: {F-OCC index+T-OCC index} by DCI/CCE
      1. Based on a specific field contained in DCI grant DCI and/or a PDCCH transmission CCE index, F-OCC code index and/or T-OCC code index to be applied to a PUCCH can be determined.
    ii. Opt 2: {F-OCC index} by DCI/CCE (T-OCC index=0 or no T-OCC)
      1. Based on a specific field in DCI and/or a PDCCH transmission CCE index, the F-OCC code index to be applied to PUCCH may be determined.
      2. T-OCC code index may be fixed to a specific value (e.g., index 0), or T-OCC may not be applied to the T-OCC code index as needed.

Next, based on PUCCH format 3 (PF3), the following methods can be considered for (initial) PUCCH resource set configuration and related PUCCH resource determination.
1) CDM
   A. Length-12 or Length-6 (or 4) pre-DFT OCC with/without T-OCC for DMRS (commonly applied to the following methods)
      i. Opt 1: 12 UEs by length-12 pre-DFT OCC with T-domain OCC for DMRS
         1. A length-12 OCC may be applied to UCI transmission OFDM symbols on PUCCH resources at the front end of the DFT. For example, assuming that the DFT input signal is a sample and allocation of K PRBs is performed, (encoded) UCI bits may be mapped to a block composed of K*N/12 samples (e.g., (K*N/12)*Q UCI bits, where Q is a modulation order). After the mapping result is repeatedly mapped to 12 blocks, OCC (with a block level) may be applied across the corresponding 12 blocks. Here, N is the number of subcarriers included in the PRB (e.g., 12), and each sample may correspond to the modulation symbol.
         2. A plurality (e.g., 2 or a multiple of 2) of DMRS transmission OFDM symbols may be configured in the single PUCCH resource, and T-domain (e.g., length-2) OCC may be applied to the corresponding DMRS symbols. 12 different DMRS resources may be constructed/distinguished as (12) combinations of the CS value applied to the DMRS sequence/symbol and the OCC code index.
      ii. Opt 2: 6/4 UEs by length-6/4 pre-DFT OCC without T-domain OCC for DMRS
         1. A length-6 or length-4 OCC may be applied to UCI transmission OFDM symbols on PUCCH resources at the front end of the DFT. For example, assuming that the DFT input signal is a sample and allocation of K PRBs is performed, (encoded) UCI bits may be mapped to a block composed of K*N/6 or K*N/4 samples (e.g., (K*N/12)*Q UCI bits, where Q is a modulation order). After the mapping result is repeatedly mapped to 6 or 4 blocks, OCC (with a block level) may be applied across the corresponding blocks. Here, N is the number of subcarriers included in the PRB (e.g., 12), and each sample may correspond to the modulation symbol.
         2. 6 or 4 different DMRS resources can be configured/distinguished by only the CS values (e.g., 6 or 4 CS values) applied to the DMRS sequence, without applying a separate T-OCC to DMRS transmission OFDM symbols.
2) Alt 1
   A. PUCCH interval (e.g., D symbols): The PUCCH interval may be allocated only one value, may be pre-defined, or may be configured for each (PUCCH resource) set through the SIB.
      i. For the OFDM symbol period occupied by PUCCH resources, the same one fixed value may be pre-defined for all (multiple) PUCCH resource sets, or one specific value may be configured for each PUCCH resource set through the SIB.
   B. Start Symbol (e.g., Index S): The start symbol may include multiple candidates, may be predefined, or may be configured for each (PUCCH resource) set through the SIB.
      i. For PUCCH transmission start symbol position/index, the same candidate index set may be pre-defined for all PUCCH resource sets, or a specific candidate index set may be configured for each PUCCH resource set through the SIB.
      ii. In addition, one specific candidate value may be configured for each PUCCH resource set through the SIB, and a candidate index set may be defined based on the corresponding candidate index. In this case, the candidate index set may be determined based on DCI signaling and/or a PDCCH CCE index, according to the candidate value for each PUCCH resource set. Alternatively, based on the candidate value for PUCCH resource set, the candidate index set may be determined based on the implicit rules (e.g., with an index set having a constant/same interval).
   C. Frequency interlace index: The frequency interlace index has only one value, may be predefined, or may be configured for each (PUCCH) set through the SIB.
      i. For the frequency (e.g., RB interlace) position/index of PUCCH resources, the same one fixed value may be predefined, or one specific value may be configured for each PUCCH resource set through the SIB.
   D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
      i. Opt 1: {Start Symbol+D-OCC Index} by DCI/CCE
         1. Based on a specific field included in DL grant DCI and/or a PDCCH transmission CCE index, a PUCCH start symbol, and/or a pre-DFT OCC (i.e., D-OCC) code index can be determined.
      ii. Opt 2: {Start Symbol} by DCI/CCE (D-OCC Index=0)
         1. Based on a specific field contained in DCI and/or a PDCCH transmission CCE index, a PUCCH start symbol can be determined.
         2. D-OCC code index may be fixed to a specific value (e.g., Index 0).
3) Alt 2
   A. PUCCH interval (e.g., D symbols): The PUCCH interval may be allocated only one value, may be pre-defined, or may be configured for each (PUCCH resource) set through the SIB.
      i. For the OFDM symbol period occupied by PUCCH resources, the same one fixed value may be pre-defined for all (multiple) PUCCH resource sets, or one specific value may be configured for each PUCCH resource set through the SIB.
   B. Start Symbol (e.g., Index S): The start symbol may be allocated only value, may be pre-defined, or may be configured for each (PUCCH resource) set through the SIB.
      i. For the PUCCH transmission start symbol position/index, the same one fixed value may be predefined for all PUCCH resource sets, or one specific value may be configured for each PUCCH resource set through the SIB.
   C. Frequency Interlace Index: The frequency interlace index may include multiple candidates, may be pre-defined, or may be configured for each (PUCCH resource) set through the SIB.
      i. For the frequency (e.g., RB interlace) position/index of PUCCH resources, the same candidate index sets may be predefined for all PUCCH resource sets, or a specific candidate index set may be configured for each PUCCH resource set through the SIB.
  ii. In addition, one specific candidate value may be configured for each PUCCH resource set through the SIB, and candidate index sets may be defined based on the corresponding candidate index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
 D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {Frequency Index+D-OCC index} by DCI/CCE
   1. Based on a specific field included in DL grant DCI and/or a PDCCH transmission CCE index, a frequency (e.g., RB interlace) index of PUCCH resources and/or pre-DFT OCC (i.e., D-OCC) code index applied to PUCCH can be determined.
  ii. Opt 2: {Frequency Index} by DCI/CCE (D-OCC index=0)
   1. Based on a specific field contained in DCI and/or a PDCCH transmission CCE index, a frequency index of PUCCH resources can be determined.
   2. D-OCC code index may be fixed to a specific value (e.g., index 0).
4) Alt 3
 A. PUCCH interval (e.g., D symbols): The PUCCH interval may be allocated only one value, may be pre-defined, or may be configured for each (PUCCH resource) set through the SIB.
  i. For the OFDM symbol period occupied by PUCCH resources, the same one fixed value may be pre-defined for all (multiple) PUCCH resource sets, or one specific value may be configured for each PUCCH resource set through the SIB.
 B. Start Symbol (e.g., Index S): The start symbol may include multiple candidates, may be predefined, or may be configured for each (PUCCH resource) set through the SIB.
  i. For PUCCH transmission start symbol position/index, the same candidate index set may be predefined for all PUCCH resource sets, or a specific candidate index set may be configured for each PUCCH resource set through the SIB.
  ii. In addition, one specific candidate value may be configured for each PUCCH resource set through the SIB, and a candidate index set may be defined based on the corresponding candidate index. In this case, the candidate index set may be determined based on DCI signaling and/or a PDCCH CCE index, according to the candidate value for each PUCCH resource set. Alternatively, based on the candidate value for PUCCH resource set, the candidate index set may be determined based on the implicit rules (e.g., with an index set having a constant/same interval).
 C. Frequency Interlace Index: The frequency interlace index may include multiple candidates, may be pre-defined, or may be configured for each (PUCCH resource) set through the SIB.
  i. For the frequency (e.g., RB interlace) position/index of PUCCH resources, the same candidate index sets may be predefined for all PUCCH resource sets, or a specific candidate index set may be configured for each PUCCH resource set through the SIB.
  ii. Alternatively, one specific candidate value may be configured for each PUCCH resource set through the SIB, and candidate index sets may be defined based on the corresponding index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
 D. In relation to PUCCH resource allocation based on DCI signaling and/or PDCCH CCE index, DCI signaling (e.g., resource indication information), and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {Start Symbol+Frequency Index+D-OCC Index} by DCI/CCE
   1. Based on a specific field contained in DL grant DCI and/or a PDCCH transmission CCE index, a PUCCH start symbol, a frequency (RB interlace) index of PUCCH resources, and/or pre-DFT OCC (i.e., D-OCC) code index can be determined.
  ii. Opt 2: {Start Symbol+Frequency Index} by DCI/CCE (D-OCC Index=0)
   1. Based on a specific field contained in DL grant DCI and/or a PDCCH transmission CCE index, a PUCCH start symbol and/or a frequency (RB interlace) index of PUCCH resources can be determined.
   2. Pre-DFT OCC (i.e., D-OCC) code index applied to PUCCH may be fixed to a specific value (e.g., Index 0)
5) Alt 4
 A. PUCCH interval (e.g., D symbols): The PUCCH interval may be allocated only one value, may be pre-defined, or may be configured for each (PUCCH resource) set through the SIB.
  i. For the OFDM symbol period occupied by PUCCH resources, the same one fixed value may be pre-defined for all (multiple) PUCCH resource sets, or one specific value may be configured for each PUCCH resource set through the SIB.
 B. Start Symbol (e.g., Index S): The start symbol may be allocated only value, may be pre-defined, or may be configured for each (PUCCH resource) set through the SIB.
  i. For the PUCCH transmission start symbol position/index, the same one fixed value may be predefined for all PUCCH resource sets, or one specific value may be configured for each PUCCH resource set through the SIB.
 C. Frequency Interlace Index: The frequency interlace index may include only one value, may be predefined, or may be configured for each (PUCCH resource) set through the SIB.

i. For the frequency (e.g., RB interlace) position/index of PUCCH resources, the same one fixed value may be predefined for all (multiple) PUCCH resource sets, or one specific value may be configured for each PUCCH resource set through the SIB.
D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {D-OCC index} by DCI/CCE
    1. Based on a specific field contained in DCI grant DCI and/or a PDCCH transmission CCE index, a pre-DFT OCC (i.e., D-OCC) code index to be applied to a PUCCH can be determined.

Next, based on PUCCH format 0 (i.e., PF0), the following methods can be considered for (initial) PUCCH resource set configuration and related PUCCH resource determination.
1) CDM
  A. 6 or 4 cyclic shifts (CSs) with T-domain OCC (commonly applied to the following Alts)
    i. Opt 1: 6/4 UEs by 6/4 CSs with length-D (e.g., D=2) T-domain OCC
      1. In a state where a total of 6 or 4 CS values are configured for sequences mapped/transmitted to each PRB on PUCCH resources, a total of 2 or 3 CS sets, each of which includes two CSs, may be constructed in consideration of (encoded) 1-bit UCI (e.g., HARQ-ACK) expression/transmission.
      2. In a state where CS (set)—based sequence mapping is repeatedly performed based on the same (encoded) UCI bit for each OFDM symbol constructing a PUCCH, length-D OCC (with a symbol-level) may be additionally applied across D OFDM symbols
2) Alt 1
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be predefined for all (multiple) PUCCH resource sets, or one specific value may be configured for each PUCCH resource set through the SIB.
  B. Start Symbol (e.g., Index S): The start symbol may include multiple candidates, may be predefined, or may be configured for each (PUCCH resource) set through the SIB.
    i. For PUCCH transmission start symbol position/index, the same candidate index set may be predefined for all PUCCH resource sets, or a specific candidate index set may be configured for each PUCCH resource set through the SIB.
    ii. In addition, one specific candidate value may be configured for each PUCCH resource set through the SIB, and a candidate index set may be defined based on the corresponding candidate index. In this case, the candidate index set may be determined based on DCI signaling and/or a PDCCH CCE index, according to the candidate value for each PUCCH resource set. Alternatively, based on the candidate value for PUCCH resource set, the candidate index set may be determined based on the implicit rules (e.g., with an index set having a constant/same interval).
  C. Frequency Interlace Index: The frequency interlace index has only one value, may be pre-defined, or may be configured for each (PUCCH resource) set through the SIB.
    i. For the frequency (e.g., RB interlace) position/index of PUCCH resources, the same one fixed value may be predefined for all (multiple) PUCCH resource sets, or one specific value may be configured for each PUCCH resource set through the SIB.
  D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
    i. Opt 1: {Start Symbol+CS Set Index+T-OCC Index} by DCI/CCE
      1. Based on a specific field contained in DCI grant DCI and/or a PDCCH transmission CCE index, a PUCCH start symbol, CS set index applied to PUCCH (sequence), and/or a T-OCC code index can be determined.
    ii. Opt 2: {Start Symbol+CS set index} by DCI/CCE (T-OCC index=0 or no T-OCC)
      1. Based on a specific field in DCI and/or a PDCCH transmission CCE index, the PUCCH start symbol and/or the CS set index may be determined.
      2. T-OCC code index may be fixed to a specific value (e.g., index 0), or T-OCC may not be applied to the T-OCC code index as needed.
3) Alt 2
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be pre-defined for all (multiple) PUCCH resource sets, or one specific value may be configured for each PUCCH resource set through the SIB.
  B. Start Symbol (e.g., Index S): The start symbol may be allocated only value, may be pre-defined, or may be configured for each (PUCCH resource) set through the SIB.
    i. For the PUCCH transmission start symbol position/index, the same one fixed value may be predefined for all PUCCH resource sets, or one specific value may be configured for each PUCCH resource set through the SIB.
  C. Frequency Interlace Index: The frequency interlace index may include multiple candidates, may be pre-defined, or may be configured for each (PUCCH resource) set through the SIB.
    i. For the frequency (e.g., RB interlace) position/index of PUCCH resources, the same candidate index sets may be predefined for all PUCCH resource sets, or a specific candidate index set may be configured for each PUCCH resource set through the SIB.
    ii. In addition, one specific candidate value may be configured for each PUCCH resource set through the SIB, and candidate index sets may be defined based on the corresponding candidate index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {frequency index+CS set index+T-OCC index} by DCI/CCE
    1. Based on a specific field included in DL grant DCI and/or a PDCCH transmission CCE index, a frequency (e.g., RB interlace) index of PUCCH resources, a CS set index applied to a PUCH sequence, and/or a T-OCC code index can be determined.
  ii. Opt 2: {frequency index+CS set index} by DCI/CCE (T-OCC index=0 or no T-OCC)
    1. Based on a specific field included in DCI and/or a PDCCH transmission CCE index, a PUCCH frequency index and/or a CS set index can be determined.
    2. T-OCC code index may be fixed to a specific value (e.g., index 0), or T-OCC may not be applied to the T-OCC code index as needed.
4) Alt 3
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be predefined for all (multiple) PUCCH resource sets, or one specific value may be configured for each PUCCH resource set through the SIB.
  B. Start Symbol (e.g., Index S): The start symbol may include multiple candidates, may be predefined, or may be configured for each (PUCCH resource) set through the SIB.
    i. For PUCCH transmission start symbol position/index, the same candidate index set may be predefined for all PUCCH resource sets, or a specific candidate index set may be configured for each PUCCH resource set through the SIB.
    ii. In addition, one specific candidate value may be configured for each PUCCH resource set through the SIB, and a candidate index set may be defined based on the corresponding candidate index. In this case, the candidate index set may be determined based on DCI signaling and/or a PDCCH CCE index, according to the candidate value for each PUCCH resource set. Alternatively, based on the candidate value for PUCCH resource set, the candidate index set may be determined based on the implicit rules (e.g., with an index set having a constant/same interval).
  C. Frequency Interlace Index: The frequency interlace index may include multiple candidates, may be pre-defined, or may be configured for each (PUCCH resource) set through the SIB.
    i. For the frequency (e.g., RB interlace) position/index of PUCCH resources, the same (multiple) candidate index sets may be predefined for all PUCCH resource sets, or a specific candidate index set may be configured for each PUCCH resource set through the SIB.
    ii. Alternatively, one specific candidate value may be configured for each PUCCH resource set through the SIB, and candidate index sets may be defined based on the corresponding index. In this case, the candidate index set may be determined based on DCI signaling and/or a PDCCH CCE index, according to the candidate index for each PUCCH resource set. Alternatively, based on the candidate value for PUCCH resource set, the candidate value set may be determined based on the implicit rules (e.g., with an index set having a constant/same interval).
D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {Start Symbol+Frequency Index+CS set index+T-OCC index} by DCI/CCE
    1. Based on a specific field contained in DCI and/or a PDCCH transmission CCE index, a PUCCH start symbol, a frequency index of PUCCH resources, a CS set index applied to a PUCCH sequence, and/or a T-OCC code index can be determined.
  ii. Opt 2: {Start Symbol+Frequency Index+CS set index} by DCI/CCE (T-OCC index=0 or no T-OCC)
    1. Based on a specific field contained in DCI and/or a PDCCH transmission CCE index, a PUCCH start symbol, a frequency index of PUCCH resources, and/or a CS set index applied to a PUCCH sequence can be determined.
    2. T-OCC code index may be fixed to a specific value (e.g., index 0), or T-OCC may not be applied to the T-OCC code index as needed.
5) Alt 4
  A. PUCCH interval (e.g., D symbols): The PUCCH interval may be allocated only one value, may be pre-defined, or may be configured for each (PUCCH resource) set through the SIB.
    i. For the OFDM symbol period occupied by PUCCH resources, the same one fixed value may be pre-defined for all (multiple) PUCCH resource sets, or one specific value may be configured for each PUCCH resource set through the SIB.
  B. Start Symbol (e.g., Index S): The start symbol has only one value, may be pre-defined, or may be configured for each (PUCCH resource) set through the SIB.
    i. For the PUCCH transmission start symbol position/index, the same one fixed value may be predefined for all (multiple) PUCCH resource sets, or one specific value may be configured for each PUCCH resource set through the SIB.
  C. Frequency Interlace Index: The frequency interlace index has only one value, may be pre-defined, or may be configured for each (PUCCH resource) set through the SIB.
    i. For the frequency (e.g., RB interlace) position/index of PUCCH resources, the same one fixed value may be predefined for all (multiple) PUCCH resource sets, or one specific value may be configured for each PUCCH resource set through the SIB.

D. In relation to PUCCH resource allocation based on DCI signaling and/or PDCCH CCE index, DCI signaling (e.g., resource indication information) and/or a PDCCH CCE index may be used to determine the PUCCH resource index (e.g., $r_{PUCCH}$) as illustrated in Table 5. In this case, based on the PUCCH resource set indicated by the SIB and the PUCCH resource index, PUCCH resources for UCI transmission can be determined as follows.
  i. Opt 1: {CS set index+T-OCC index} by DCI/CCE
    1. Based on a specific field contained in DCI grant DCI and/or a PDCCH transmission CCE index, a CS set index applied to a PUCCH sequence and/or a T-OCC code index can be determined.
  ii. Opt 2: {CS set index} by DCI/CCE (T-OCC index=0 or no T-OCC)
    1. Based on a specific field in DCI and/or a PDCCH transmission CCE index, the CS set index applied to a PUCCH sequence can be determined.
    2. T-OCC code index may be fixed to a specific value (e.g., index 0), or T-OCC may not be applied to the T-OCC code index as needed.

Figure 17:
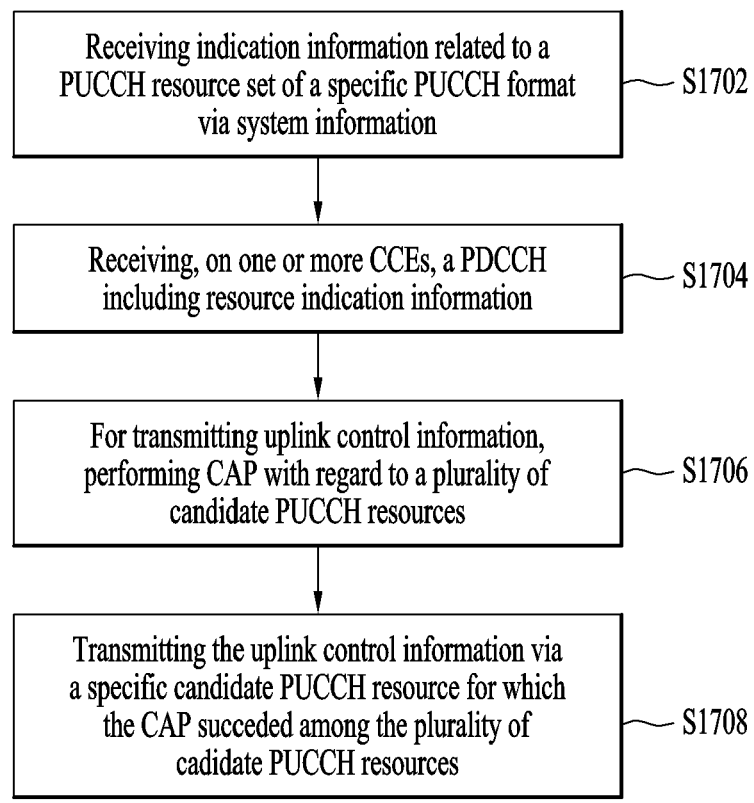

FIG. 17 is a flowchart illustrating a method for transmitting UL control information according to the present disclosure.

Referring to FIG. 17, the UE may receive indication information related to a PUCCH resource set of a specific PUCCH format through system information (SI) (S1702). In addition, the UE may receive a PDCCH including resource indication information on one or more CCEs (S1704). Thereafter, in order to transmit UL control information, the UE may perform CAP(s) for the plurality of candidate PUCCH resources (S1706), and may transmit UL control information through a specific candidate PUCCH resource that has successfully performed the CAP (S1708). Here, a plurality of start symbols corresponding to a plurality of candidate PUCCH resources may be determined based on resource indication information and a start CCE index of a PDCCH with respect to a single value configured for the corresponding PUCCH resource set. In addition, the specific candidate PUCCH resources may include a plurality of discontinuous RBs in the frequency domain. In addition, a length-12 sequence having a CS value corresponding to UL control information may be transmitted through an RB of a specific candidate PUCCH resource without using a DMRS. Here, the length-12 sequence may be repeatedly transmitted in a plurality of symbols, and a symbol-level orthogonal cover code can be applied to the plurality of symbols. Here, the wireless communication system may include a 3GPP NR wireless communication system, and a specific PUCCH format may be a PUCCH format 0.

(2) Dedicated PUCCH Resource Set Configuration and PUCCH Resource Determination

First, based on PF2, the following methods can be used for (dedicated) PUCCH resource set configuration and a resource element (RE) configuration included in PUCCH resources related to such PUCCH resource set configuration, and a detailed description thereof is as follows.

1) Alt 1
  A. Different (F-domain) OCC lengths between PUCCH resources (sets)
    i. The length of F-OCC applied to PF2 may be set to different values between PUCCH resources and/or between PUCCH resource sets. Accordingly, PF2 resources (the respective PRBs on the corresponding resources) to which different F-OCC lengths are applied may be configured with different ratios between DMRS REs and UCI REs.
    ii. For example, for a UCI payload size of X-bits (e.g., X=2) or less, PUCCH resources (sets) may be constructed as PF2 resources to which the length-6 F-OCC is applied. In this case, the ratio of DMRS REs to UCI REs may be set to 6:6.
    iii. As another example, for the UCI payload size of X-bits (e.g., X=2) or greater, PUCCH resources (sets) may be constructed as PF2 resources to which F-OCC having a length-4, a length-2, or a length-1 (i.e., non-application of F-OCC). In this case, the ratio of DMRS REs to UCI REs may be set to 4:8.

Next, the following method can be considered for a PF3-based (dedicated) PUCCH resource set configuration and a symbol configuration included in PUCCH resources related to such PUCCH resource set configuration, and a detailed description thereof is as follows.

1) Alt 1
  A. Different (pre-DFT) (i.e., D-OCC) OCC lengths between PUCCH resources (sets)
    i. The length of D-OCC applied to PF3 may be set to different values between PUCCH resources and/or between PUCCH resource sets. Accordingly, PF3 resources to which different D-OCC lengths are applied may allow the T-OCC length applied to the number of DMRS symbols and/or the DMRS symbol to be set to different values.
    ii. For example, for the UCI payload size of X-bits (e.g., X=2) or less, PUCCH resource (sets) can be constructed as PF3 resources to which the length-12 D-OCC is applied. In this case, for the corresponding PF3 resources, a plurality (2 or a multiple of 2) of DMRS symbols may be constructed, and the T-domain (e.g., length-2) OCC may be applied to the corresponding DMRS symbols.
    iii. As another example, for the UCI payload size of X-bits (e.g., X=2) or greater, PUCCH resources (sets) may be constructed as PF3 resources to which D-OCC having a length-6, a length-4, a length-3, a length-2 or a length-1 (i.e., non-application of D-OCC). In this case, if the PUCCH resources (sets) are composed of only one DMRS symbol (and/or even when the PUCCH resources (sets) are composed of multiple DMRS symbols), T-OCC may not be applied to the DMRS symbol.

Next, the following method can be considered for a PF0-based (dedicated) PUCCH resource set configuration and a symbol configuration included in PUCCH resources related to such PUCCH resource set configuration, and a detailed description thereof is as follows.

1) Alt 1
  A. Different (T-domain) OCC lengths between PUCCH resources (sets)
    i. T-OCC length applied to PF0 or information about whether T-OCC is applied may be set to different values between PUCCH resources and/or PUCCH resource sets.
    ii. For example, whereas the length-D (e.g., D>1, D=2) T-OCC is applied to PF0 belonging to a specific PUCCH resource (set), the length-1 T-OCC may be applied to PF0 belonging to another PUCCH resource (set), or T-OCC may not be applied to PF0 in an equivalent manner to the length-1 T-OCC.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
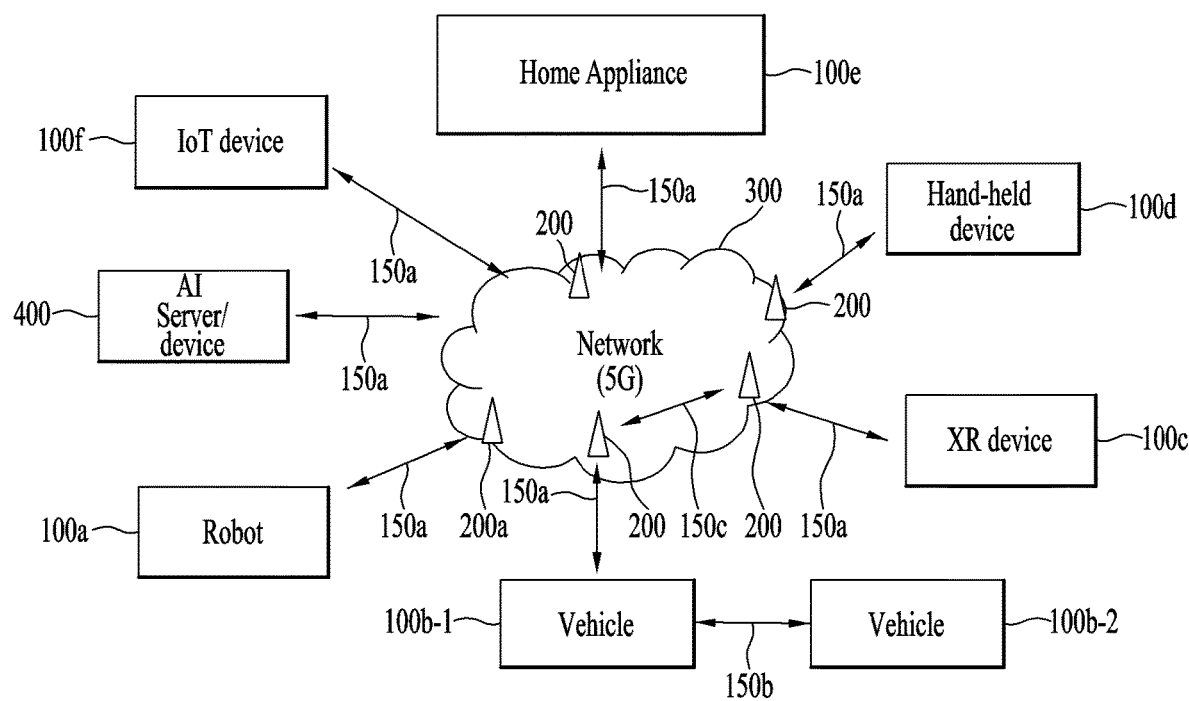
FIGS. 18 to 21 illustrate a communication system 1 and wireless devices, which are applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BS s/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
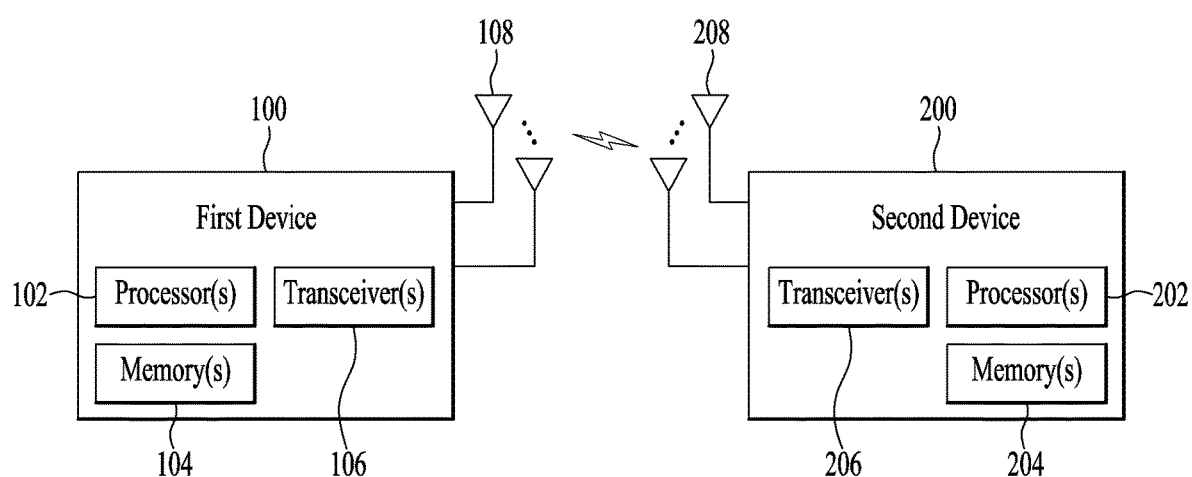

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Herein, at least one memory (e.g., 104 or 204) may store instructions or programs. When executed, the instructions or programs may cause at least one processor operably coupled to the at least one memory to perform operations according to some embodiments or implementations of the present disclosure.

In the present disclosure, a computer readable (storage) medium may store at least one instruction or computer program, wherein the at least one instruction or computer program may cause, when executed by at least one processor, the at least one processor to perform operations according to some embodiments or implementations of the present disclosure.

In the present disclosure, a processing device or apparatus may include at least one processor and at least one computer memory connectable to the at least one processor. The at least one computer memory may store instructions or programs. When executed, the instructions or programs may cause the at least one processor operably coupled to the at least one memory to perform operations according to some embodiments or implementations of the present disclosure.

Figure 20:
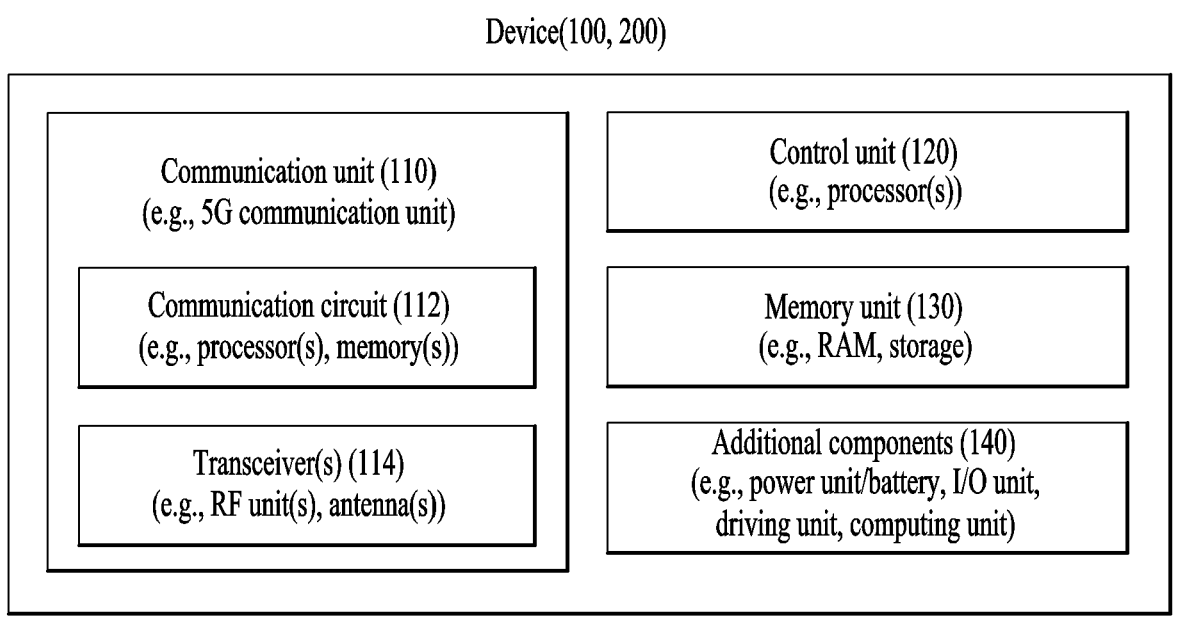

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
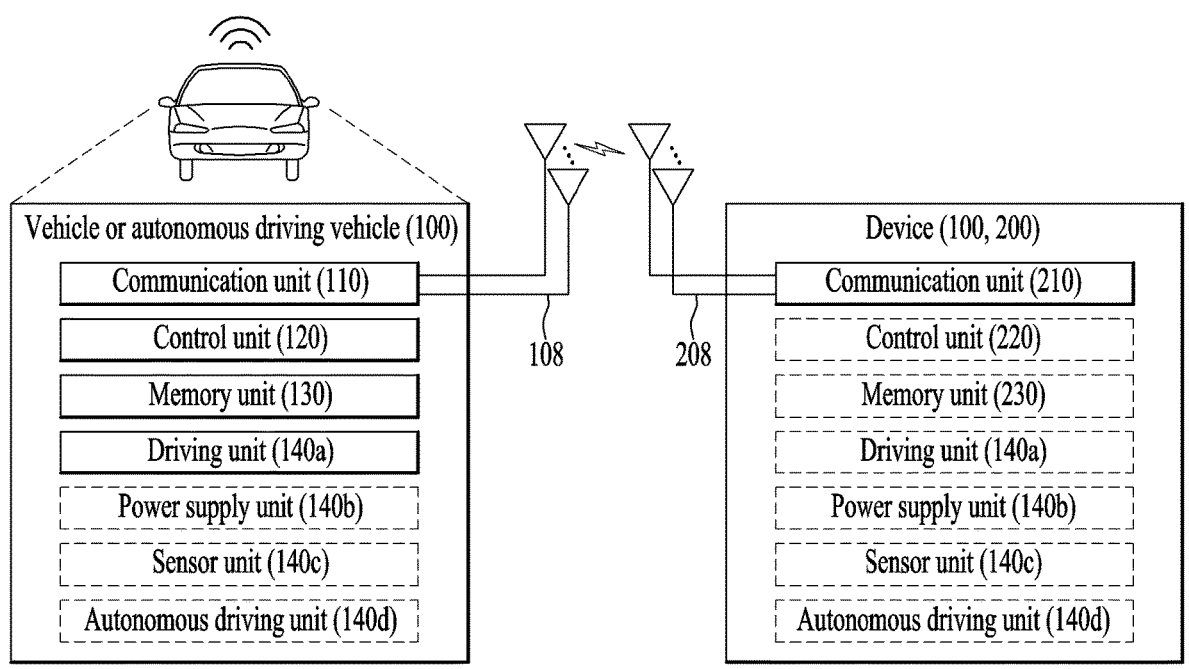

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, or other equipment in a wireless mobile communication system.

The invention claimed is:
1. A method by a user equipment (UE) comprising:
receiving information related to an uplink control channel resource set among multiple uplink control channel resource sets;
receiving a downlink control channel including downlink control information including resource indication information;
for a transmission of an uplink control channel, performing a channel access procedure (CAP); and
transmitting the uplink control channel including uplink control information based on a channel sensed to be idle by the CAP,
wherein the uplink control channel is transmitted on a specific uplink control channel resource related to the channel among a plurality of uplink control resources of the uplink control channel resource set,
wherein a plurality of start symbols for the plurality of uplink control channel resources are determined based on the resource indication information, an index of a first control channel element (CCE) for a reception of the downlink control channel and a single value configured for the uplink control channel resource set, and
wherein an index of an orthogonal cover code (OCC) for a time domain used for the specific uplink control channel resource is determined based on a specific field included in the downlink control information, and the index of the OCC for a frequency domain is fixed to 0.

2. The method according to claim 1, wherein:
the specific uplink control channel resource includes a plurality of discontinuous resource blocks (RBs) in a frequency domain.

3. The method according to claim 2, wherein:
a length-12 sequence having a cyclic shift (CS) value corresponding to the uplink control information is transmitted through the plurality of discontinuous RBs of the specific uplink control channel resource without a demodulation reference signal (DMRS).

4. The method according to claim 3, wherein:
the length-12 sequence is repeatedly transmitted in a plurality of symbols,
wherein the OCC for the time domain is applied to the plurality of symbols in a symbol level.

5. The method according to claim 1, wherein:
the UE is configured to operate in a wireless communication system that includes a 3rd Generation Partnership Project (3GPP) New Radio (NR) wireless communication system.

6. A user equipment (UE) comprising:
at least one processor; and
at least one memory operatively connected to the at least one processor, and configured to store instructions such that the at least one processor performs specific operations by executing the instructions,
wherein the specific operations include:
receiving information related to an uplink control channel resource set among multiple uplink control channel resource sets;
receiving a downlink control channel including downlink control information including resource indication information;
for transmission of an uplink control channel, performing a channel access procedure (CAP); and
transmitting the uplink control channel including uplink control information based on a channel sensed to be idle by the CAP,
wherein the uplink control channel is transmitted on a specific uplink control channel resource related to the channel among a plurality of uplink control resources of the uplink control channel resource set,
wherein a plurality of start symbols for the plurality of uplink control channel resources are determined based on the resource indication information, an index of a first control channel element (CCE) for a reception of the downlink control channel and a single value configured for the uplink control channel resource set, and
wherein an index of an orthogonal cover code (OCC) for a time domain used for the specific uplink control channel resource is determined based on a specific field included in the downlink control information, and the index of the OCC for a frequency domain is fixed to 0.

7. The user equipment (UE) according to claim 6, wherein:
the specific uplink control channel resource includes a plurality of discontinuous resource blocks (RBs) in a frequency domain.

8. The user equipment (UE) according to claim 7, wherein:
a length-12 sequence having a cyclic shift (CS) value corresponding to the uplink control information is transmitted through the plurality of discontinuous RBs of the specific uplink control channel resource without a demodulation reference signal (DMRS).

9. The user equipment (UE) according to claim 8, wherein:
the length-12 sequence is repeatedly transmitted in a plurality of symbols,
wherein the OCC for the time domain is applied to the plurality of symbols in a symbol level.

10. The user equipment (UE) according to claim 6, wherein:
the UE is configured to operate in a wireless communication system that includes a 3rd Generation Partnership Project (3GPP) New Radio (NR) wireless communication system.

11. A device for a user equipment (UE) comprising:
at least one processor; and
at least one memory operatively connected to the at least one processor, and configured to store instructions such that the at least one processor performs specific operations by executing the instructions,
wherein the specific operations include:
receiving information related to an uplink control channel resource set among multiple uplink control channel resource sets;
receiving a downlink control channel including downlink control information including resource indication information;
for transmission of an uplink control channel, performing a channel access procedure (CAP); and
transmitting the uplink control channel including uplink control information based on a channel sensed to be idle by the CAP,
wherein the uplink control channel is transmitted on a specific uplink control channel resource related to the channel among a plurality of uplink control resources of the uplink control channel resource set,
wherein a plurality of start symbols for the plurality of uplink control channel resources are determined based on the resource indication information, an index of a first control channel element (CCE) for a reception of the downlink control channel and a single value configured for the uplink control channel resource set, and
wherein an index of an orthogonal cover code (OCC) for a time domain used for the specific uplink control channel resource is determined based on a specific field included in the downlink control information, and the index of the OCC for a frequency domain is fixed to 0.

12. The device according to claim 11, wherein:
the specific uplink control channel resource includes a plurality of discontinuous resource blocks (RBs) in a frequency domain.

13. The device according to claim 12, wherein:
a length-12 sequence having a cyclic shift (CS) value corresponding to the uplink control information is transmitted through the plurality of discontinuous RBs of the specific uplink control channel resource without a demodulation reference signal (DMRS).

14. The device according to claim 13, wherein:
the length-12 sequence is repeatedly transmitted in a plurality of symbols,
wherein the OCC for the time domain is applied to the plurality of symbols in a symbol level.

15. The device according to claim 11, wherein:
the UE is configured to operate in a wireless communication system that includes a 3rd Generation Partnership Project (3GPP) New Radio (NR) wireless communication system.

* * * * *